United States Patent [19]

Werner

[11] 3,737,864

[45] June 5, 1973

[54] METHOD AND APPARATUS FOR BYPASSING DISPLAY REGISTER UPDATE DURING PROCEDURE ENTRY

[75] Inventor: John R. Werner, Glendora, Calif.

[73] Assignee: Burroughs Corporation, Detroit, Mich.

[22] Filed: Nov. 13, 1970

[21] Appl. No.: 89,178

[52] U.S. Cl. ........ 340/172.5
[51] Int. Cl. ........ G06f 7/00
[58] Field of Search ........ 340/172.5

[56] References Cited

UNITED STATES PATENTS

| | | | |
|---|---|---|---|
| 3,461,433 | 8/1969 | Emerson | 340/172.5 |
| 3,461,434 | 8/1969 | Barton et al. | 340/172.5 |
| 3,551,895 | 12/1970 | Driscoll, Jr. | 340/172.5 |
| 3,412,382 | 11/1968 | Couleur et al. | 340/172.5 |
| 3,647,979 | 3/1972 | Rubin | 340/172.5 |
| 3,614,746 | 10/1971 | Klinkhamer | 340/172.5 |
| 3,548,384 | 12/1970 | Barton et al. | 340/172.5 |

*Primary Examiner*—Harvey E. Springborn
*Attorney*—Christie, Parker & Hale

[57] ABSTRACT

A data processing system of this disclosure has an addressable main memory and a data processor for executing instructions stored in the main memory. Each of a plurality of main memory storage locations has stored in it one of a plurality of control words. Each control word is associated with one of a sequence of numbers that are referred to as lexicographical levels. Each of a plurality of information fields is contained in a different one of the control words and each information field provides an indication which is said to point to a control word that is associated with the next lower lexicographical level from the control word containing the information field. By virtue of these information fields, the control words are linked together to form a tree structured list, and each of a plurality of groups of the control words form one of a plurality of what are referred to as paths of the tree. All paths of the tree have in common at least one control word. That is, at least the control word associated with the lowest lexicographical level is a part of every path. On the other hand, the control words that are associated with higher lexicographical levels may be in either in only one path or in a plurality of the paths. The data processor has a plurality of display registers. During operation of the system, each of a group of the display registers contains an indication, preferably what is referred to as an absolute address, which is said to point to a successive one of the control words in one of the paths of the tree. Each display register is associated with the same lexicographical level as the control word to which the indication in that display register points. The data processor has control and timing circuitry responsive to a predetermined instruction for automatically updating the display registers so that, after execution of this instruction, the indications stored in the display registers point to control words in a new path of the tree (i.e. a different path from the path of the tree containing the control words pointed to before execution of this instruction). In updating the display registers, control words in the new path of the tree are transferred to the data processor by sequentially reading them out of the main memory in a sequence that proceeds from higher to lower lexicographical levels. The information fields contained in the transferred control words are each used to produce the address of the memory location storing another control word in the sequence and also to produce an updated indication for storage into a sequentially selected one of the display registers. Means are provided for bypassing the updating of display registers, which includes means for indicating when the display registers associated with lower lexicographical levels and which have not yet been updated already contain indications pointing to the control words in the new path of the tree.

14 Claims, 15 Drawing Figures

INVENTOR.
JOHN R. WERNER
BY
Christie, Parker & Hale
ATTORNEYS

FIG. 5

```
2 BEGIN
  PROCEDURE A (DOIT); PROCEDURE DOIT;
3 BEGIN
      REAL I, J;
       I ← 5;
       DOIT (I, J);
       IF J=25 THEN WRITE ("WORKED")
                ELSE WRITE ("FAILED");
  END;
   PROCEDURE B;
3 BEGIN
       REAL K;
      PROCEDURE C (X, Y); REAL X, Y;
  4 BEGIN
        Y ← X⊗X;
        K ← 2;
    END;
        K ← 1;
        A (C);
        IF K=2 THEN WRITE ("WORKED")
               ELSE WRITE ("FAILED");
  END;
    B;
END
```

| PROGRAM LEVEL: | CODE CONTAINED IN: | CAN REFERENCE: | BY THE ADDRESS COUPLE (ll,s) |
|---|---|---|---|
| 2 | OUTER BLOCK | A | 2,2 |
| | | B | 2,3 |
| 3 | PROCEDURE A | A | 2,2 |
| | | B | 2,3 |
| | | DOIT | 3,2 |
| | | I | 3,3 |
| | | J | 3,4 |
| 3 | PROCEDURE B | A | 2,2 |
| | | B | 2,3 |
| | | K | 3,2 |
| | | C | 3,3 |
| 4 | PROCEDURE C | A | 2,2 |
| | | B | 2,3 |
| | | K | 3,2 |
| | | C | 3,3 |
| | | X | 4,2 |
| | | Y | 4,3 |

INITIAL CONDITION

PHASE V

METHOD AND APPARATUS FOR BYPASSING DISPLAY REGISTER UPDATE DURING PROCEDURE ENTRY

BACKGROUND OF THE INVENTION

1. Field of the Invention

This invention relates to data processing systems and more particularly to processors for executing programs that are arranged in procedural blocks.

2. Description of the Prior Art

The following description of the prior art and also the remainder of the specification uses terminology which is also used in the following patents and printed publications which are hereby incorporated by reference herein: U.S. Pat. No. 3,200,379 by King et al; U.S. Pat. No. 3,461,434 by Barton et al; U.S. Pat. No. 3,548,384 by Barton et al; U.S. Pat. No. 3,546,677 by Barton et al; U.S. Pat. No. 3,593,312 by Barton et al;

"ALGOL 60 Implementation" by Randall & Russell, published in 1964 by Academic Press;

"A Guide to ALGOL Programming" by D. D. McCracken, copyrighted in 1962 by John Wiley & Sons, Inc., the Eighth printing of which was made in January 1967;

"Burroughs B6500 Information Processing Systems Reference Manual," published by the Burroughs Corporation, assignee of this invention;

"Electronic Digital Systems," by R. K. Richards, published by John Wiley & Sons, Inc., in 1966;

"A Programming Language," by K. E. Iverson, published by John Wiley & Sons, Inc., in 1962.

Many well known high level programming languages, such as ALGOL, have a block structure. The McCracken publication identified above provides a tutorial treatment of the block structure of the languages. FIG. 5 is an example of an actual ALGOL program illustrating the block structure. Each block is bracketed by the terms BEGIN and END which serve as parenthesis to mark off the perimeter of the block. A preselected one of a plurality of lexicographical levels, is assigned to each of the blocks shown in the program of FIG. 5. The term "lexicographical" is used herein in the same sense it is used in the Randall and Russell publication identified above. Each block of a program written in ALGOL can have nested within it other blocks which are each assigned a higher lexicographical level than the block within which it is nested. Each block nested within a particular block is related to the particular block as a sub-block thereof. In the exemplary program of FIG. 5, the outermost block is assigned lexicographical level 2 and it has two sub-blocks identified as PROCEDURE A and PROCEDURE B, each of which is assigned a lexicographical level of 3.

Within each block the programmer can declare procedures, parameters and variables which become local to that block. The term "declare" and a related term "declaration" are used herein in the same sense as they are used in the McCracken publication, identified above. For example, the program of FIG. 5 contains a declaration within the block for Procedure B that the parameter K is real. The assignment statement K ← 2 makes reference to K which is a local parameter to that block.

Additionally, assignment statements within a block can make reference to procedures, parameters or variables that are global to such block. A parameter or variable is "global" to a particular block if such block is a sub-block to the block in which the parameter or variable is defined. An example of a global parameter is described in U.S. Pat. No. 3,461,434 at column 2.

Programs expressed in ALGOL cannot be accepted directly by present computers and special purpose programs referred to either as translators or compilers must be provided for translating each program expressed in ALGOL language into machine language. Machine language is the actual code which causes the computer to carry out its own computing operations. A general description of the function of a translator program is contained in the Richards publication, identified above. As Richards reports at p. 341 of his publication, Polish notation is useful in methods of translating programs. Further, Richards provides in pages 224–227 and 314–329 of his publication a description of the operation of a LIFO (i.e., last-in, first-out) storage unit and the utility of such LIFO storage units in manipulating data in accordance with instructions employing Polish notation. As brought out particularly at page 227 of the Richards publication, the LIFO storage unit he describes contemplates an addressable memory for storing instructions and a separate addressable storage device for performing the function of the LIFO storage unit. However, it is not necessary to provide an addressable storage device that is separate from the addressable memory storing the instructions, and the Burroughs Corporation has for years sold systems such as the B5000 and B5500 Data Processing Systems wherein the same main memory has one portion storing instructions and another portion serving as a stack storage unit.

U. S. Pat. No. 3,548,384 which issued on an application Ser. No. 672,042, filed Oct. 2, 1967 in the names of Robert S. Barton et al. entitled, PROCEDURE ENTRY FOR A DATA PROCESSOR EMPLOYING A STACK, and assigned to the same assignee as the present invention, discloses a data processing system that employs hardware aids to minimize the translation required between ALGOL programs and actual machine codes. One such hardware aid is a stack mechanism contained in a data processor in the system. The stack mechanism cooperates with a plurality of memory locations of a main memory in the system to form such a LIFO storage unit. In operation, the stack mechanism causes a plurality of words to be accumulated in the main memory in the form of a stack of information and provides for these words to be exchanged between the processor and the main memory on a last in, first out basis. That is, the last word of a series of words stored by the stack mechanism into the main memory as a part of the stack is, when the stack mechanism reads the series out of the main memory, the first word to be read out.

The stack mechanism serves two basic functions. One is that it provides a means for accumulating in main memory for temporary storage words of information such as of parameters, variables, and references to data and program segments; and a second is that it provides a means to store an indication of the history and structure of the program.

U.S. Pat. Nos. 3,548,384, 3,461,434, and 3,546,677 each teach the construction and operation of a data processor having a second hardware aid that is referred to as a display register memory. Hereinafter in this description of the prior art, references to "the processor" are with respect to a processor constructed in accordance with the teachings of these three patents. An actual data processor constructed to include a display register memory has been sold by the Burroughs Corporation as a part of the B6500 Data Processing System. My invention, hereinafter described and claimed, was made before the B6500 System was placed on sale and, accordingly, as actually sold, the B6500 System embodies my invention and does not exhibit the problems, described below, which I discovered to exist in the processor taught by these three patents.

The display register memory comprises a plurality of display registers. Each display register is associated with a sequential one of a plurality of lexicographical levels. The purpose of the display registers is to make available in the processor an indication of the locations in the main memory which store control words that mark the beginning of a stack area assigned to store the information to be accumulated during execution of a procedural block. These control words are called Mark Stack Control Words (MSCW). The format of an MSCW appears in FIG. 1A. The contents of a display register are said to point to a memory location. This is a shorthand way of saying that the address of a memory location can be derived from the contents of the display register.

With this information available to it, the processor can locate parameters in the stack by base relative addressing techniques. Parameters are generally located in the stack by a lexicographical level (*ll*) value plus an increment value (δ). These two values, in combination, are called an address couple. The lexicographical level selects one of the display registers. The contents of the selected display register are then combined with the increment value to give the absolute address of the desired parameter. The means for deriving an absolute address of a parameter using the address couple is disclosed in detail in U.S. Pat. No. 3,461,434 by R. S. Barton et al.

Note that the MSCW contains a DISP field and a DF field. The DISP field provides a linkage between the MSCWs such that the MSCWs form a tree structured list. FIG. 2 is a sketch illustrating the tree structure of the list formed by the MSCWs during the execution of the program of FIG. 5. The location of each word entered in the list is called a node. A lexicographical level is assigned to each node. One node is assigned the lowest level of the tree and is called the trunk. In FIG. 2, the trunk of the tree is labeled "Outer Block" and is assigned level 2. A plurality of other nodes are assigned higher levels. In FIG. 2, the nodes A and B are assigned level 3 and node C is assigned level 4. Each node has a branch linking it to a node at the next lower level. Thus, node C has a branch linking it to node B which is at level 3 and nodes A and B each have a branch linking them to node OB which is at level 2. Node C is called a leaf.

FIG. 3 illustrates in a different form how the MSCWs are linked together. As indicated at the left side of FIG. 3, the local storage for blocks OUTER, B, A and C were formed in the stack in that order. The DF fields of the MSCWs provide a stack history list so indicating. As indicated on the right side of FIG. 3, the DISP fields link the MSCWs together in an entirely different manner.

The tree structured list maintained in the stack provides the processor with the information it needs to cause the display registers to reflect the current addressing environment. For example, the addressing environment for procedure A includes all the local parameters of procedure A and the local parameters of OUTER BLOCK which, of course, are global to procedure A. Thus, before it actually begins to execute procedure A, the processor causes one display register to point to the MSCW for procedure A and another display register to point to the MSCW for OUTER BLOCK. On the other hand, the addressing environment for procedure C includes all the local parameters of procedure C and the local parameters of procedures B and OUTER BLOCK which, of course, are global to procedure C. Thus, when the processor enters procedure C from procedure A the display registers must be updated to reflect the new addressing environment.

Preparatory to entering a new procedure, the processor inserts an IMSCW into the stack. The IMSCW contains a DF field pointing to the last MSCW entered into the stack. The new procedure is actually entered in response to a program operator called an "Enter" operator. The Enter operator has five distinguishable phases of operation. During the first phase the processor obtains a Program Control Word (PCW) which provides information describing the new procedure. During the second phase the processor distributes the information contained in the PCW to various registers and collects the information in the various registers forming a Return Control Word (RCW) which provides information describing the old or calling procedure. During the third phase the processor updates the addressing environment list. This is done by replacing the IMSCW with an MSCW. This MSCW contains the same DF field as the IMSCW and in addition includes a DISP field. This DISP field points to the MSCW at the next lower lexicographical level along a path of the tree structured list from the new MSCW toward the trunk.

During the fourth phase the processor updates the display registers to reflect the new addressing environment. First the processor stores the address of the new MSCW in the display register associated with the lexicographical level of the new procedure. Thereafter, the processor determines the addresses of each MSCW within the new addressing environment and stores these addresses one by one into the display registers until it reaches the display register associated with the lowest lexicographical level. Each such address is determined by making a main memory access to recover a DISP field which points to the next address to be stored. This process is quite time consuming because a great deal of time is required for each such main memory access. In an actual embodiment (i.e., the B6500 Data Processing System, identified above) there are 32 display registers. Thus, it could be possible for the computer to make 31 main memory accesses during this fourth phase. In addition to being time consuming, this process is frequently inefficient because many of the display registers undergoing updating already contain the correct information.

During the fifth phase the address of the program string for the new procedure is obtained.

SUMMARY OF THE INVENTION

A data processing system according to this invention comprises an accessible main memory and a display register memory. The main memory includes a plurality of addressable locations each storing a mark word. Each mark word is associated with one of a plurality of level values with some of the mark words being associated with the same level value. Each of a plurality of the mark words contains a displacement value field indicating the address of a mark word associated with a sequentially different level value from the mark word containing the displacement value field. A plurality of the displacement value fields each indicates the same address. The mark words are thus linked together by the displacement value fields to form a tree structured list having a plurality of paths. Each path of the list includes a plurality of the mark words with some of the mark words being in more than one path. The display register memory includes a plurality of display registers each corresponding to a sequential one of the level values. Each display register provides for storing the address of a mark word associated with its corresponding level value. In one stage of operation of the system, a plurality of the display registers respectively store the addresses of the mark words that are linked in a first path of the list. The first path of the list includes at least one mark word that is also linked in a second path of the list. The system further comprises means for updating the display registers so that they store the addresses of the mark words in the second path of the list. Significantly, in the system of this invention the updating means is operative to bypass the updating of display registers that store addresses of mark words that are linked into both the first and second paths. The updating means comprises means for sequentially providing the address of each mark word linked in the second path of the list including means operative to utilize each of the addresses indicated by the displacement value fields of the mark words in the second path for making a main memory access to obtain a displacement value field indicating the address of another mark word in the second path. Means are provided for sequentially comparing pairs of addresses, each pair of addresses including one of the sequentially provided addresses and a sequentially selected one of the addresses stored in the display register memory. The comparing means includes means for sequentially indicating whether the compared addresses are not equal or equal. Means are provided for storing into the display register memory each provided address indicated as not equal to the address compared with it so as to replace the address compared with it. Means responsive to an indication that the compared addresses are equal provide for terminating the operation of the means for making a main memory access.

Preferably, this invention is embodied in a programmable data processing system having a processor that includes the above-described display registers and having an addressable main memory storing information including the mark words described above and also a plurality of program operators of a program that is arranged into a plurality of procedures. A predetermined one of the program operators directs the processor to stop executing a first one of the procedures and to commence executing a second new procedure. In this preferred embodiment, each of the above-described paths of the tree structured list indicates an addressing environment for a different one of the plurality of procedures. At the stage of operation of the system prior to the execution of the predetermined program operator, a plurality of the display registers each store the address of a different one of the mark words in the addressing environment of the first procedure. In response to predetermined operator the display register updating means updates the display registers so that they store the addresses of the mark words in the addressing environment of the second procedure.

In a further preferred feature of a data processing system embodying this invention, the main memory stores information that is arranged into a plurality of stack areas. The mark words described above are respectively positioned in the plurality of stack areas and provide for linking the stack areas together to form a tree structured stack.

A method in accordance with this invention is practiced in a programmable data processing system for processing a program that is arranged into a plurality of procedural blocks. Each block is assigned one of a plurality of level values. A first one of the blocks has declared in it a second one of the blocks. The second block is a calling procedure that orders programmatic entry into a third, called one of the blocks. The programmable data processing system includes a memory storing the tree structured list of words described above and includes the display registers described above. The steps of the method are as follows: the level value assigned to the called block is stored for indicating a display register; the address of the control word that is in the addressing environment of the called block and that is associated with the same level value as the called block is stored into the indicated display register; the address of the control word that is in the addressing environment of the first block and that is associated with the same level as the first block is stored for comparison; the level value for indicating a display register is changed so as to indicate a display register corresponding to a sequentially different level value; the address stored in the newly indicated display register is read out and compared with the address saved for comparison; when the comparison operation indicates that the two compared addresses are different, the address in the newly indicated display register is replaced with the address stored for comparison; the address stored for comparison is replaced with the address of the word linked to the word contained in the address being replaced; the level value for indicating a display register is changed again and the steps following this step are repeated cyclically until the comparison operation indicates equality thereby indicating that the updating of the remaining display registers can be bypassed.

BRIEF DESCRIPTION OF THE DRAWINGS

FIG. 5 is an example of an actual ALGOL program used to illustrate the operation of the computer system of FIG. 1 in accordance with the present invention;

FIG. 7 also shows the address couples assigned to the various parameters and procedure references contained in the stack;

DESCRIPTION OF THE PREFERRED EMBODIMENT

Figure 1:
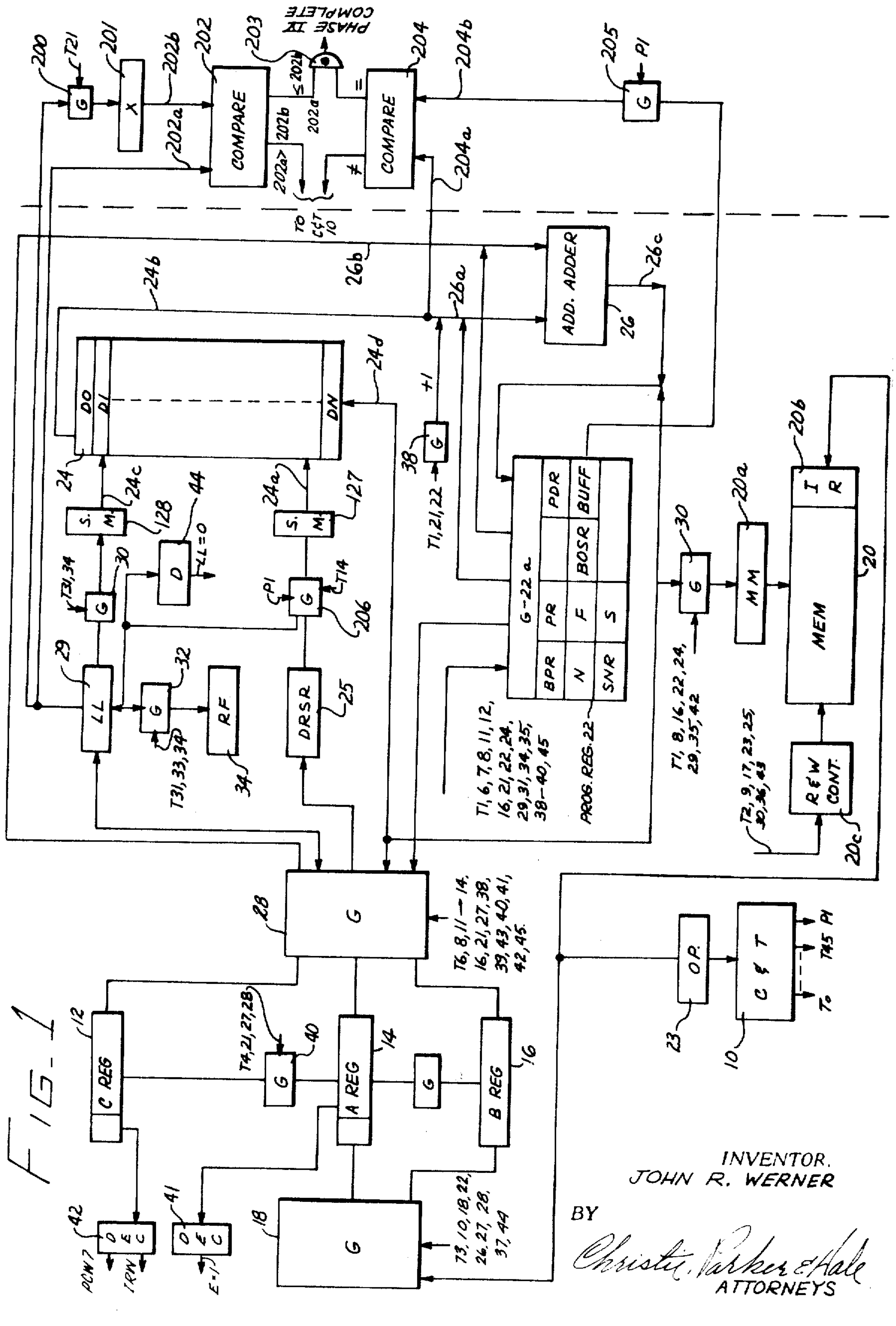
FIG. 1 is a block diagram of a data processing system and embodying the present invention.

Refer now to FIG. 1 which shows on the right of the dashed lines the apparatus for causing the bypassing of the display register updating and which shows the connection between this apparatus and a computer system having a plurality of display registers. Except as specifically pointed out hereinafter, the construction and operation of the computer system shown to the left of the dashed lines is the same as the computer system described in the above-identified application Ser. No. 672,042, now U. S. Pat. No. 3,548,384, the disclosure of which is incorporated by reference herein.

The apparatus shown to the right of the dashed line includes a compare circuit 202. Compare circuit 202 is connected to two input buses referred to as **202*a* and 202*b*. Input bus 202*a* connects the input of compare circuit 202 to the output of an LL register 29 shown within the computer system to the left of the dashed line. Input bus 202*b* connects the input of the compare circuit 202 to an X register 201. As will be explained in greater detail hereinafter, LL register 29 stores signals indicative of a procedure level. While the processor is executing a procedure, LL register 29 stores the level value of the current procedure. During the course of executing an "Enter" operator which causes processor to enter a called procedure from a calling procedure, the level value for the calling procedure is transferred from LL register 29 by a gate 200 into X register 201. Later during the execution of the Enter operator the level of the called procedure is stored in LL register 29 and then the LL register is made operative to countdown to define a sequence of different levels. Compare circuit 202 is operative to compare level values indicated by the signals it receives by its inputs and to form a control signal on one of two output lines. When the level value stored by LL register 29 is greater than the level value stored by X register 201, compare circuit 202 produces a control signal so indicating on an output line referenced as 202*a* > 202*b* (which in this specification will hereinafter be more briefly identified as >), otherwise compare circuit 202 produces a control signal on a line referenced as 202*a* ≤ 202*b*** (which in this specification will be more briefly identified as ≤).

Also shown to the right of the dashed line is compare circuit 204 which is connected to two input buses referenced as **204*a* and 204*b*. Input bus 204*a* connects the input of compare circuit 204 to the output of a plurality of display registers 24 shown in the computer system to the left of the dashed lines. Input bus 204*b* connects the input of compare circuit 204 to gate 205. As will be explained in greater detail hereinafter, compare circuit 204 will receive on its input lines signals representing absolute memory addresses. Compare circuit 204 is operative to produce a control signal on one of two output lines. When the absolute addresses it receives on its input lines are the same, compare circuit 204 produces a control signal so indicating on an output line referenced as =. Otherwise compare circuit 204** produces a control signal on an output line referenced as ≠.

The ≤ output of compare circuit 202 and the = output of circuit 204 are connected to the two inputs of an AND gate 203. The output signal of AND gate 203 is referenced as Phase IV complete. As will be explained in more detail hereinafter the Phase IV complete signal is formed after all necessary changes have been made to the display registers.

The computer system contains three registers referred to as the C register 12, the A register 14 and the B register 16. The A and B registers together with a group of storage locations in a memory 20 form a means for storing a stack that is arranged into a plurality of stack areas. F and S sub-registers in a program register 22 store addresses for the memory locations in memory 20 and are used in keeping track of the memory locations being used to store a stack area. The A and B registers 14 and 16 form the top two storage locations of the stack and are time shared between stack areas. In accumulating information in a stack area, the information is put into the A register and transferred down to the B register, then transferred down from the B register to the storage locations in the memory 20 that provide for storing the stack area. This transfer is made via a gate 18 under control of a control and timing unit 10. Information is brought back out of the stack in reverse order and taken out of the top of the stack from the A register. As a word is taken out from the A register the information in the rest of the stack is effectively pushed up one position by appropriately changing the content of the S register, contained in the program register 22, which points at the top of the stack. The complete detail of operation of the stack is not essential for a complete understanding of the operation of the present invention and, therefore, only that part pertinent to the present invention is given. However, such a stack is described in detail in a book entitled, "Electronic Digital Systems," by R. K. Richards published in 1966 by John Wiley & Sons, Inc. on pages 224 through 229.

An operator register 23 stores the operators for execution by the computer system of FIG. 1. The operator register 23 is coupled to the control and timing unit 10 for use in controlling the sequence of operation of the system. Operators are obtained from the memory 20 and stored into the operator register 23 under control of the content of the PR sub-register of the program register 22 in a conventional manner well known in the computer art. The details of this particular operation are not given herein.

The memory 20 is a conventional magnetic core memory system and operates in a manner well known in the computer art. It has an information register **20*b* and an address register (hereinafter referred to as the MM register) 20*a*, and a read and write control unit 20*c*. The address of the memory location into which information is written and from which it is read out is controlled by addresses stored in the MM register 20*a***.

The system also includes a memory having a group of display registers 24. The individual display registers are referenced by the symbols DO through DN. Each of the display registers 24 contains (i.e. has stored in it) an absolute address of a memory location in the memory 20. To be explained in more detail, each display register that is used contains the absolute address of the beginning of a block of storage in a stack contained in the memory 20. Each absolute address is actually the address of a Mark Stack Control Word (MSCW) (see FIG. 1A) which is stored at the beginning of each block of storage.

The display registers 24 are formed of a group of transistor flip-flop circuits and all registers together form a memory. There are a group of input lines 24*a*, one line for each of the display registers, D1 through DN. A read signal on any one of the lines causes the content of the corresponding register to be read out and applied instantaneously on an output bus 24*b*.

Output bus 24*b* is connected to Address adder 26 (ADD. ADDER) as in above-identified application Ser. No. 672,042 and in addition is connected by bus 204a to one input of compare circuit 204 of the update bypass apparatus of the present invention.

Associated with the display registers 24 of FIG. 1, as in above-identified application Ser. No. 672,042, is a selection matrix 127 and a Display Register Selection Register (hereinafter referred to as the DRSR register) 25. A lexicographical level (*ll*) value, which is defined in more detail hereinafter, can be stored in the DRSR register and can designate a particular display register. An *ll* value stored in the DRSR register can be gated to selection matrix 127 which responds to provide a signal on the corresponding one of the read lines 24*a*, causing the content of the corresponding display register to be read out onto the bus 24*b*. A second group of input lines 24*c* is provided, one for each of the display registers. A write signal on one of the lines 24*c* causes an address to be written into the corresponding register. The address which is written into the selected display register is determined by signals applied in parallel to a group of input lines 24*d*.

A selection matrix 128 is coupled to the input lines 24*c* and determines the line to which a write control signal is applied. The selection matrix 128 is coupled to LL register 29 through a gate 30. As in above-identified application Ser. No. 672,042, the LL register 29 also stores a lexicographical level (*ll*) value which identifies the display register into which the selection matrix 128 is to cause a write operation. In contrast to the computer system of above-identified application Ser. No. 672,042 , in the system of FIG. 1, the *ll* value stored in LL register 29 can be used to designate a particular display register for reading as well as for writing. To that end a gate 206 is provided for coupling LL register 29 to the selection matrix 127. Gate 206 responds to a control pulse P1 received from control and timing unit 10 to apply the *ll* value stored in LL register 29 to selection matrix 127. The selection matrix 127 then forms a read signal on one of the lines 24*c* and thereby causes an address to be read from a selected display register and to be applied to compare circuit 204. In addition LL register 29 is connected to gate 200 and to compare circuit 202 by bus 202*a*. Gate 200 is responsive to control signal T21 to cause the contents of LL register 29 to be transferred into an X register 201 which has its output connected to compare circuit 202.

The address adder 26 has two input buses 26a and 26b. The input bus 26a is coupled to the output bus 24b of the display register memory 24, and to the output of the program register 22. The input bus 26*a* is also coupled to a gate 38 which is capable of applying a signal representing the value 1 to the bus 26*a*. The input bus 26*b* is coupled through a gate 28 to the A, B and C registers 14, 16 and 12. The address adder 26 has an output bus 26*c* which is coupled to the program register 22 and to the MM register 20*a* via a gate 30 and to the A, B and C registers 14, 16 and 12 via the gate 28. The address adder 26 is a conventional parallel adder which combines the address signals applied on its input buses 26*a* and 26*b* and applied the sum to the output bus 26*c*.

An RF register 34 is provided for temporarily storing the lexicographical level (*ll*) value from the LL register 29. A gate 32 is provided for transferring information between LL register 29 and the RF register 34. The gate 32 is also operative for causing the content of the LL register 29 to be counted down one unit at a time as described in more detail hereinafter.

The program register 22 an be considered as a large register with sub-registers therein, as indicated by the reference symbols in FIG. 1. A gate 22*a* causes information to be written in the appropriate sub-registers and causes information to be read out of the appropriate sub-registers under control of timing signals from the control and timing unit 10.

Program register 22 of the present invention differs somewhat from the corresponding program register of above-identified application Ser. No. 672,042. Specifically, the buffer (BUFF) sub-register shown therein now has a separate connection to a gate 205 shown to the right of the dashed lines. Gate 205 is responsive to a control signal P1 to cause the contents of the BUFF sub-register to be applied to compare circuit 204.

The control and timing unit 10 is a conventional timing unit which operates in accordance with the flow diagram of FIG. 4. It is adapted to respond to the presence of an enter operator in operator register 23 to produce on its output circuits the control signals referenced by the symbols T0 through T45 and P1. The sequence with which the timing signals are formed at the output circuits are indicated by the flow diagram of FIG. 4. In order to tie in the flow diagram of FIG. 4 to the timing signals formed by the control and timing unit 10, numbers are shown in parenthesis in FIG. 4, i.e., (0) (1,2,3) etc. These numbers correspond to the numbers following the letter T for the output circuits of the control and timing unit 10. It should be noted that control signals T21 and P1 perform novel functions that are important to the present invention.

Decoders 41, 42 and 44 are connected to the A register 14, the C register 12 and the LL register 29, respectively. These decoders have output circuits connected to the control and timing unit 10 (connections are not shown). The decoders provide certain signals indicative of the content of the corresponding registers as described in more detail in the description of operation.

To fully appreciate the means and operation involved in updating the display registers, some of the ALGOL programming concepts involved will be given.

Consider the example of a program expressed in ALGOL which is shown in FIG. 5 and which illustrates a condition wherein display registers must be updated. FIG. 5 is also the actual program represented by the tree structured list of FIGS. 2 and 3. The display update is required during a procedure entry under two conditions, namely (1) when a procedure enters another procedure which was passed to it as a parameter, and (2)

during an entry when an expression is passed to a procedure by name rather than by value.

The ALGOL program of FIG. 5 is an example of when a procedure enters another procedure which was passed to it as a parameter.

Consider first what is meant by the expressions given in FIG. 5. Lines 1 and 29 indicate the beginning and end of the whole program and by definition also define the outer procedural block.

The expression PROCEDURE A (DOIT) at line 3 defines a procedure named A and that it uses the parameter which will be called DOIT. The following expression PROCEDURE DOIT means that DOIT is actually a subroutine procedure, as opposed to a variable.

The procedure A and its parameters are defined between lines 4 and 11. The expression REAL I,J defines two local variables to be called I and J. The expression I ← 5 indicates I is to be set to 5. The expression DOIT (I,J) means that the procedure DOIT is to be executed, using the parameters I and J in its computational steps. The expressions at lines 9 and 10, although not strictly ALGOL expressions, indicate what information is to be printed out on a printer.

The expression PROCEDURE B at line 13 defines another procedure known as B. The local entities and executable statements for B are defined from line 14 to line 26. The expression REAL K at line 15 defines a local variable called K.

The expression PROCEDURE C (X,Y) at line 16 defines a subroutine called procedure C. The two parameters to be used in procedure C are defined as X and Y. The expression REAL X,Y indicates that these parameters in procedure C are real numbers as contrasted to integer, Boolean variables, or other ALGOL entities.

The expressions at lines 17 through 20 actually define the parameters and steps involved in procedure C. The expression Y ← X8X means that the parameter X is to be squared and the result is to be placed where the parameter Y is stored.

Lines 22 through 25 are additional expressions for procedure B. The expression K ← 1 means that the parameter K (defined at line 15) is to be set to 1.

The expression A(C) is an action item and means that procedure A is to be called into operation using procedure C as the parameter for DOIT (at line 3). This is what was meant by entering another procedure (entering procedure A from B) passing procedure C as a parameter to procedure A.

The symbol B at line 28 means that the procedure B is to be called into operation. Procedure B is actually the first operational step that is called into operation. Procedure B calls procedure A into operation.

FIG. 5 has been divided into procedural blocks in accordance with the rules of ALGOL by the vertical lines at the lefthand side of FIG. 5. Also, program levels have been assigned to the blocks. These levels are indicated by the numerals at the top of the vertical line. The program levels are used in forming the addressing environment for the program.

Figure 2:
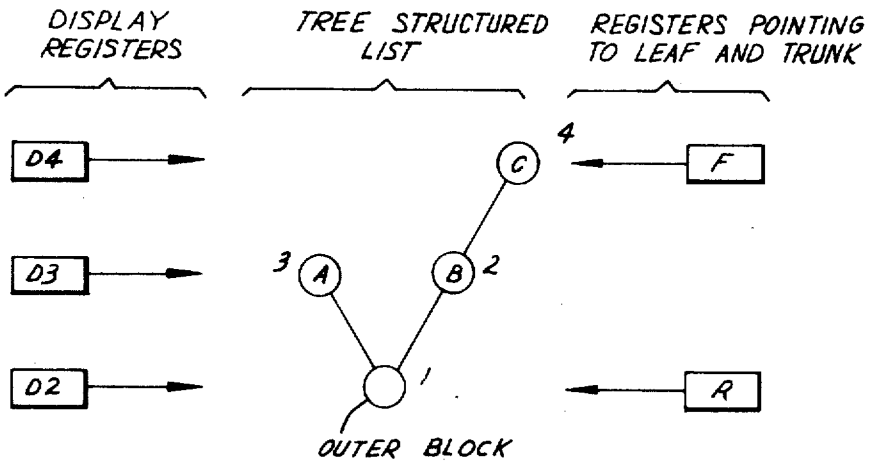
FIG. 2 is a sketch illustrating the tree structure of an example of the ALGOL address environment list.
Figure 3:
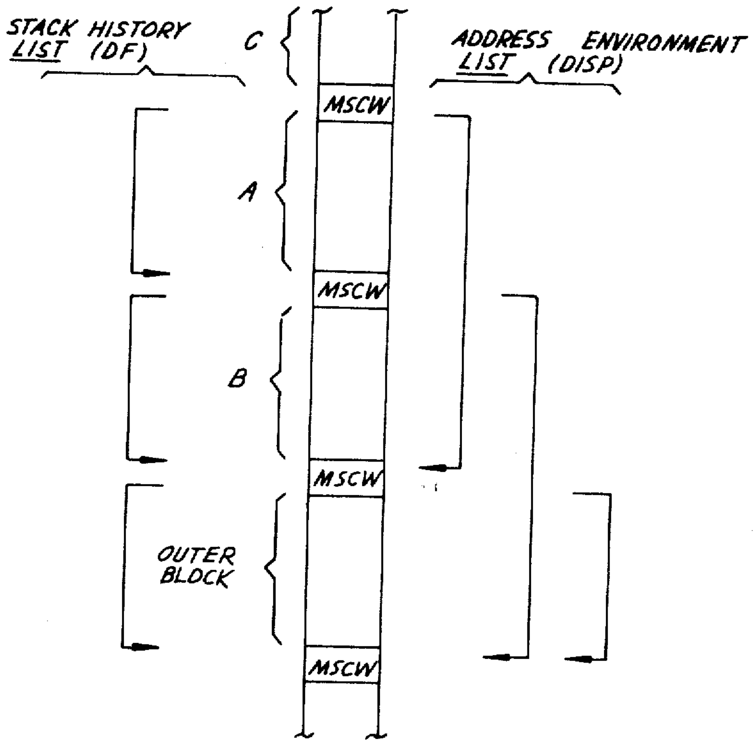
FIG. 3 is a sketch illustrating a stack showing the linkage of the stack history list and the linkage of the address environment list.

The address environment list is established when the program is structured by the programmer and is referred to as a lexicographical ordering of the procedural blocks. Referring to FIG. 2, which is a representation of the address environment list for the program of FIG. 5, the block "OUTER" represents the block starting at line 1 and ending at line 29 in FIG. 5. This procedural block is assigned a lexicographical level of 2. The block B of FIG. 2 begins at line 14 and ends at line 26 of FIG. 5. This procedural block is assigned a lexicographical level of 3. The block A of FIG. 2 begins at line 4 and ends at line 11 in FIG. 5. This procedural block also has a lexicographical level 3. The procedural block for procedure C in FIG. 2 begins at line 17 and ends at line 20 of FIG. 5. This procedural block is assigned a lexicographical level of 4.

The ALGOL program of FIG. 5 is compiled or translated into a machine code. This process is actually accomplished in the machine by a program called a compiler. In other words, it is translated into the actual machine instructions required for the particular computing system. In accordance with the present invention, the lexicographical ordering shown in FIG. 5 is used to form address couples.

The address couple consists of two items, (1) the lexicographical level (*ll*) of the parameter or procedural declaration, and (2) an index value ($\delta$) used to locate the specific parameter or procedural declaration within a lexicographical level. The lexicographical ordering of the program remains static as the program is executed, thereby allowing parameters to be referenced via an address couple as the program is executed. The address couple is converted into an absolute address when the parameter is referenced. This conversion utilizes the display registers 24 as disclosed and claimed in U.S. Pat. No. 3,461,434 entitled STACK MECHANISM HAVING MULTIPLE DISPLAY REGISTERS.

Briefly, there is a display register for each lexicographical level (*ll*) of a program. The lexicographical level (*ll*) of an address couple is used to select a display register. The address register stores an absolute address which, when added to the index value, gives the address of the desired parameter.

Figures 6, 7:
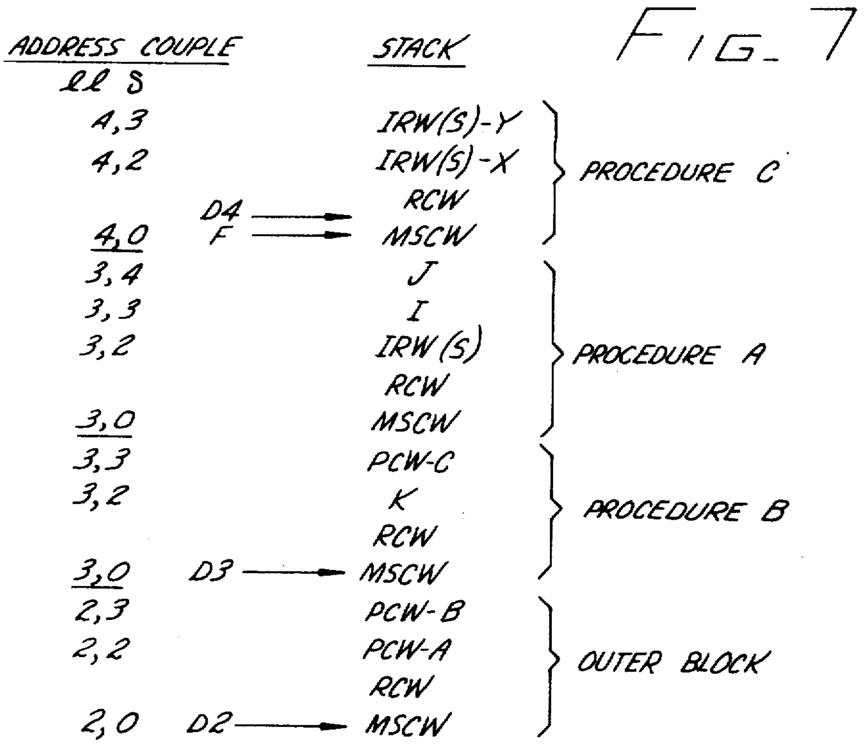
FIG. 6 is a table illustrating which variables and parameters can be accessed by which procedures in the ALGOL program illustrated in FIG. 5, and includes an example of the address couples which would be assigned to the various procedures, variables and parameters.
FIG. 7 is a table showing an example of the content of a stack during the operation of the data processor of FIG. 1 which is described herein.

Refer now to FIG. 6 which is a table which would be prepared by the compiler showing which items can be accessed by which procedures and the address couples to be used. The table of FIG. 6 contains four columns. The one column shows the four procedural blocks shown in FIG. 5. Another column indicates the items which can be addressed or referred to within the procedural blocks. Another column shows an example of the address couples (*ll*,$\delta$) that would be assigned to the various items shown in FIG. 5. As indicated in FIG. 6, the outer procedural block can reference or address the items A and B and are assigned the address couples 2,2 and 2,3, respectively. Procedure A can reference or address items A and B (defined in the outer procedural block) as well as the items DOIT, I and J which are declared or defined in procedure A. The corresponding address couples are shown. The other items and their address couples can be noted in the same manner.

Figure 1A:
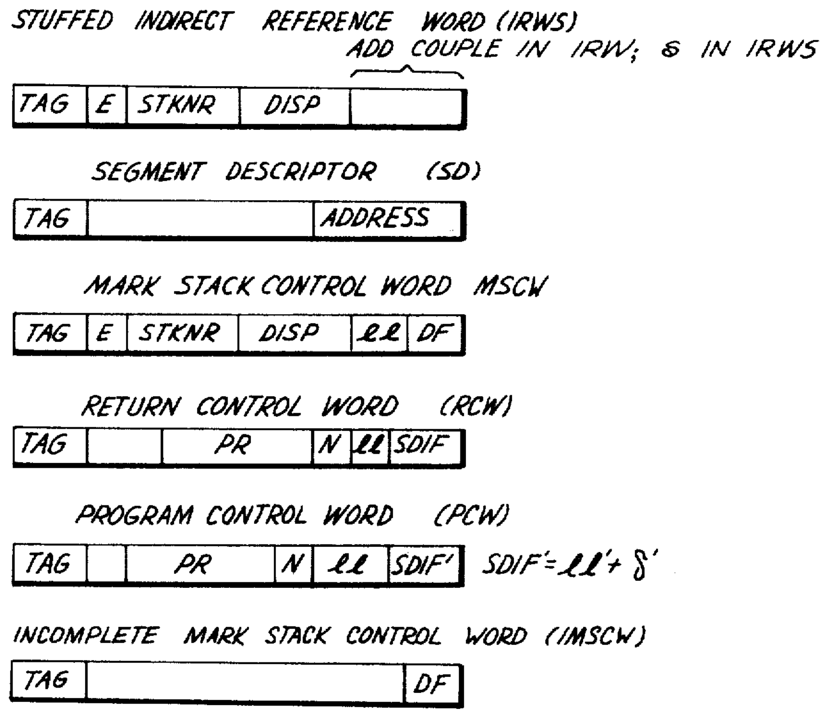
FIG. 1A is a sketch showing the word format of some of the words used in the computer system of FIG. 1.

Consider now the types of words of information stored in a stack. In general, the words stored in a stack are variables, reference words and control words of various types. FIG. 1A is a sketch which illustrates the word structure of the reference words and the control words used herein. The symbols used to abbreviate the various words are indicated in parenthesis. The words illustrated in FIG. 1A are composed of fields containing one or more bits of information. These fields are represented by various symbols. Table I gives an explanation of the various symbols used.

TABLE I

| Symbol | Description of Symbols |
|---|---|
| TAG | Identifies type of word. |

| | |
|---|---|
| E | Identifies whether the corresponding word contains STKNR and DISP fields. |
| STKNR | Identifies the number of a stack. |
| DISP | A value which when added to the absolute address contained in the BOSR register gives the address of a MSCW. This value is used to link the MSCWs together to form the address environment list. |
| *ll* | This is a lexicographical level. An *ll* value can be used to select a particular display register which stores the absolute address of an MSCW corresponding to the *ll* value |
| δ | δ is a value which when added to the absolute address of an MSCW gives the address of a desired item. |
| ADD COUPLE | This is an address couple field comprising an *ll* field and a δ field. The *ll* part points to a particular display register and the δ part is added to the contents of that display register to yield the address of a desired item. |
| DF | A value which when subtracted from the address of the word in which this field was found gives the address of an MSCW. This is the value used to link the MSCWs together in order to provide the stack history list. |
| PR and N | Values which identify the state of the computer and the next operator to which the computer is to return following the entry into a new procedure. |
| SDIF | Contains a modified lexicographical level (*ll'*) and displacement field (δ'). The *ll* selects a display register to which (δ) is added to form an absolute address to locate the segment descriptor to which the computer is to return at the end of a subroutine or procedure. |
| SDIF' | Contains a modified lexicographical level value (*ll'*) and displacement field (δ'). The *ll'* points to a display register and δ' is a value which when added to the content of that display results in the address of a segment descriptor which in turn contains the absolute address of another procedure. |
| ADDRESS | A value contained in a segment descriptor (SD) which is the absolute address of the beginning of a procedure. |

The purpose of the above-listed items and the way in which they are used will be described in detail in the description of operation.

FIG. 7 shows an example of the content of a stack at one stage during the execution of the ALGOL program shown in FIG. 5. The address couples assigned to the various words in the stack are shown at the lefthand side of FIG. 7. The words in the stack to which the display registers D2, D3 and D4 and the F register point by means of addresses contained therein are also indicated by arrows. The stack structure of FIG. 7 is of considerable importance and must be carefully noted in order to follow the operation of the computer system given hereinafter.

The lexicographical level (*ll*) of the address couple, (the first numeral of each pair of numerals in the address couple) identifies a display register which in turn contains the absolute address of a Mark Stack Control Word (MSCW) which is positioned at the base of a particular stack storage area. For example, lexicographical level (*ll*) 2 identifies display register No. 2 (D2) which in turn contains the absolute address of the MSCW at the base of the block OUTER. Referring to FIG. 6, it will be noted that the outer block has been assigned program level 2 and that each of the items which can be referenced in the outer procedural block contain a lexicographical level (*ll*) of 2. For example, the program control word PCW-A for procedure A is assigned an address couple 2,2 and the program control word PCW-B for procedure B is assigned an address couple 2,3. Referring to FIG. 7 the entities within each procedural block of storage are stored in consecutive memory locations. Thus, a particular item in a procedural block is referenced by adding the increment value (δ) to the absolute address contained in the corresponding display register. For example, the address of the program control words for procedures A and B (PCW-A and PCW-B) can be obtained by adding the increment values 2 and 3, respectively, to the absolute address contained in the display register No. 2 (D2). By a similar process the other parameters in the stack shown in FIG. 7 can be located.

Assuming the display registers D2, D3 and D4 have absolute addresses of the MSCW at the base of procedure blocks OUTER, B and C as shown in FIG. 7, parameters and reference words within the blocks OUTER, B and C can be obtained with reference to the respective display registers and hence are visible to the procedure being executed.

FIGS. 8A through 8E are sketches which illustrate the actual content of the stack shown in FIG. 7 at different times during an example of operation of the system. These figures also contain blocks and symbols representing the content of various registers which are of importance to an understanding of the present invention.

Figure 8A:
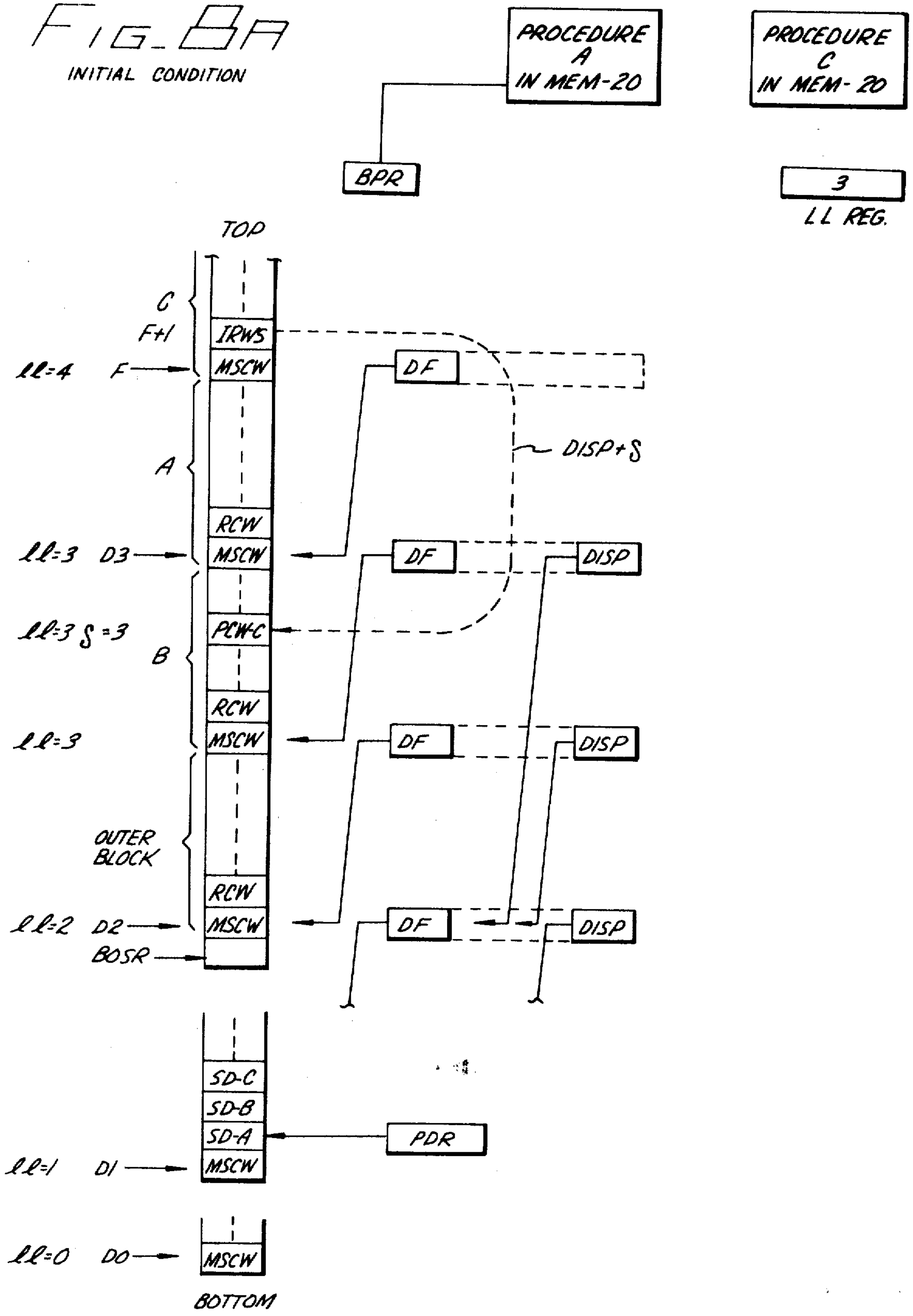
FIGS. 8A through 8E are sketches of the stack shown in FIG. 7 with portions deleted and illustrations of the content of various registers indicating the sequence of operation of the computer system of FIG. 1 during the example of operation described herein.

Refer now to FIG. 8A which illustrates the initial condition of the stack during the operation to be described herein and consider how the address environment list of the stack has actually been formed using the MSCWs. The address environment list of the stack is formed by linking the MSCWs together by use of the STKNR and DISP fields (see FIG. 1A) in accordance with the lexicographical structure of the program and thereby indicate the address environment. This linkage information is contained within the STKNR and DISP field of the MSCWs. These fields are inserted into the MSCWs as each procedure is entered.

The BOSR of the program register 22 (see FIG. 1) contains the absolute address of the base of the stack currently in use. The stack history list is formed by linking the DF field of each MSCW back to the immediately preceding MSCW in the stack. The DF field contains a value which when subtracted from the absolute address of the immediately preceding MSCW in which the DF appears gives the absolute address of the MSCW to which the DF field is pointing. Thus, for example, in FIG. 8A, the DF field of the MSCW of procedure C points back to the MSCW of procedure A, the DF field of the MSCW of procedure A points back to the MSCW of procedure B, and the DF field of the MSCW of procedure B points back to the MSCW of the block OUTER.

The address environment list is formed using the DISP fields. Thus, for example, in FIG. 8A, the DISP field of the MSCW for procedure A points back to the MSCW of the block OUTER and the DISP field of the MSCW of procedural block B points back to the MSCW for the block OUTER.

It should be noted that the word at the base of the procedural block storage C does not contain a DISP field in FIG. 8A and for this reason is said to be an Incomplete Mark Stack Control Word (IMSCW). Before the operation to be explained hereinafter is completed a DISP field is automatically added into the IMSCW which then points back to the MSCW for the procedural block B. The stack after the IMSCW has been replaced by an MSCW and is shown in FIG. 8C. This operation is referred to as updating the address environment list and will be explained in detail. Dashes are used in FIG. 8A as well as 8a through 8E to indicate that there is information in the stack which is not shown. The information not shown need not be considered for the example of operation set forth herein.

Display register DO contains the address of the bottom of a stack area containing program information. The content of this stack area is not given and is not important to an understanding of the present invention.

Segment descriptors for procedures A, B and C (SD-A, SD-B, and SD-C) are stored in the bottom of the stack. The display register D1 is reserved for pointing at the base of the stack area containing the segment descriptors. The display register D1 contains the absolute address of the base of the segment descriptor storage area. The segment descriptors contain absolute addresses (ADDRESS, see FIG. 1A) which point to the machine language codes for the respective procedures A, B and C.

The next information of significance in the stack is an MSCW and an RCW which are in the storage area for the block OUTER. The RCW in the block OUTER contains the information and other data required to return the computer from the block OUTER procedure back to an operative program procedure upon completion of the example program.

Following the block storage for the block OUTER is the storage area for procedure B. Again, at the bottom of the storage area for procedure B is an MSCW and an RCW. The RCW in the storage for procedure B contains data which allows the computer to return to the block OUTER following the execution of procedure B. The next word of significance to the following operation is a PCW which points to the segment descriptor for procedure C (SD-C) which in turn points to procedure C. Stating it differently, the PCW contains an SDIF' field which has *ll* ' and δ' fields which are used to determine the absolute address of the segment descriptor (SD-C) which contains the base of the area containing the machine language code for procedure C.

The bottom two words in the storage area for procedure A are an MSCW and an RCW. The RCW in the storage area for procedure A contains the required information to return the computer from procedure A to procedure B after the procedure A has been executed.

As stated hereinabove at the base of the block storage for procedure C are an IMSCW and an IRWS. The stuffed IRW (IRWS) following the MSCW for storage area C contains a DISP field and a delta field (δ) which point or reference to the program control word (PCW-C) stored in the storage area for procedure B. The DISP and δ fields when added together and added to the content of the BOSR register produce the absolute address of the PCW-C. Therefore, the DISP and δ are said to be values which reference the PCW-C.

Other initial conditions of the registers in FIG. 1 should be noted. As indicated, FIG. 8A, the BPR register of the program register 22 contains the absolute address of the base of the memory area containing the machine language code for procedure A. Procedure A is the one currently being executed. The LL register 29 contains a value 3 which is the level of the program or the lexicographical level for procedure A currently being executed.

The PDR register of the program register 22 contains an absolute address which is the address of the segment descriptor for procedure A (SD-A).

To provide a better understanding of the operation of the system, a brief summary of the operation of the circuits shown in FIG. 1 will be given followed by a detailed description. Consider first the brief description of operation.

The system of FIG. 1 basically has five different phases of operation referred to as Phases I, II, III, IV and V. These phases of operation take place in response to an "ENTER" operator placed into the operator register 23 and utilize the stack shown in FIG. 8A in its initial condition. The five phases and a brief description of the operation during each phase follows. Reference should be made to the stack shown in FIG. 8A-8E during the following discussion.

BRIEF DESCRIPTION OF OPERATION

Phase I: Initially the control and timing unit 10 causes the stuffed indirect reference word (IRWS) stored in the stack storage area for procedure C to be read out of the memory 20. The DISP field contained within the IRWS is added to the contents of the BOSR register and the result is stored in the BUFF subregister. This result is the absolute address of the MSCW for procedure B which is the procedure in which procedure C was declared. This result will remain in the BUFF register until it is used during Phase IV. During Phase I the contents of the BUFF register are added together with the δ field of the IRWS to obtain address of the PCW-C in the stack area for procedure B. The PCW-C is subsequently read out of the memory 20 and stored in the C register 12. Thus, the C register 12 now contains the PCW-C which points off in memory via the segment descriptor SD-C to the new procedure C which is to be executed.

Phase II: During Phase II the information in the PCW-C stored in the C register 12 is transferred to the program register 22 and to the LL register 29 in order to set them up to execute procedure C. Also the content of certain sub-registers of the program register 22 and the LL register 29 are transferred to the C register 12 in order to generate an RCW. The RCW is then stored back into the stack at the place that the IRWS was read from and is used to return to procedure A when procedure C is complete. In addition the contents of LL register 29 are transferred to X register 201.

Figure 8B:
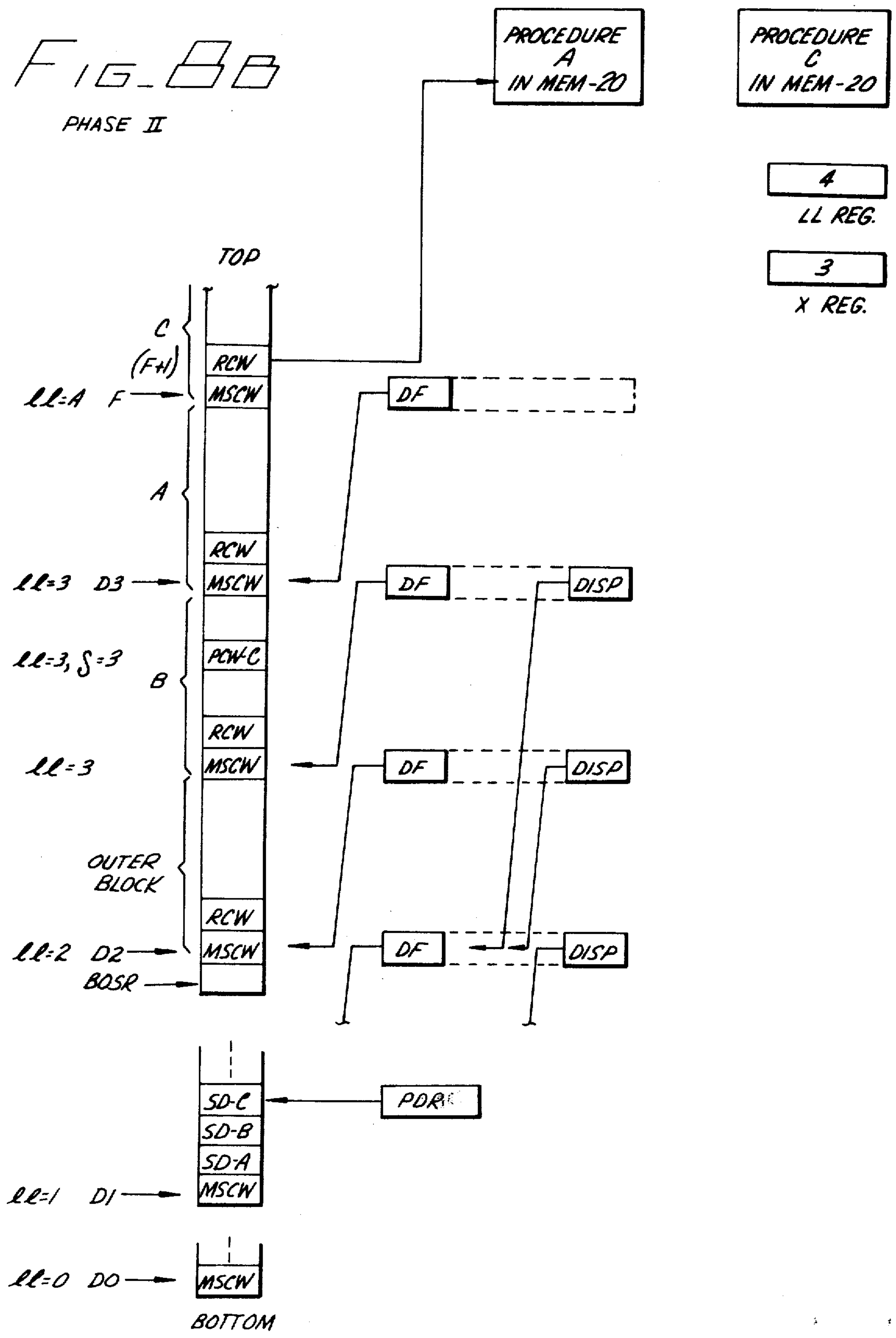
Figure 8C:
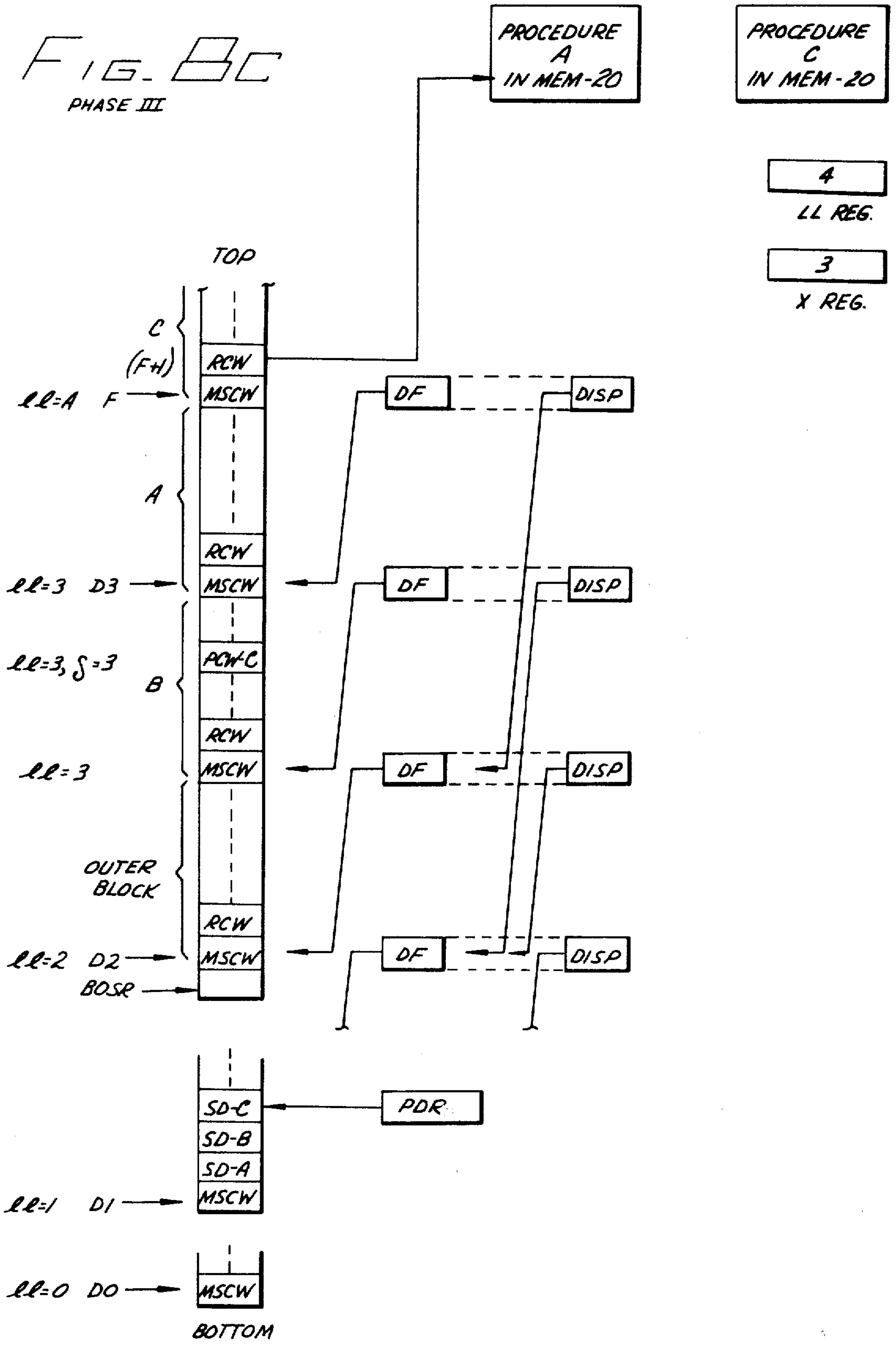

FIG. 8B shows the content of the stack and the indicated registers in the system of FIG. 1 following Phase II. As illustrated, the new RCW in the stack now points to the machine language code for procedure A and the PDR sub-register of the program register 22 now points to the segment descriptor for procedure C (SD-C). Also the LL register 29 now contains the value 4 which is the lexicographical level for procedure C, and X register 201 now contains the value 3 which is the lexicographical level for procedure A.

Phase III: During Phase III the DISP field of the IRWS formerly stored where the new RCW is now stored is combined with the IMSCW to provide a complete MSCW with a linkage back to the MSCW at the base of the storage area for procedure B. Thus, the address environment list is dynamically updated. The condition of the stack and other registers following Phase III is shown in FIG. 8C.

Figure 8D:
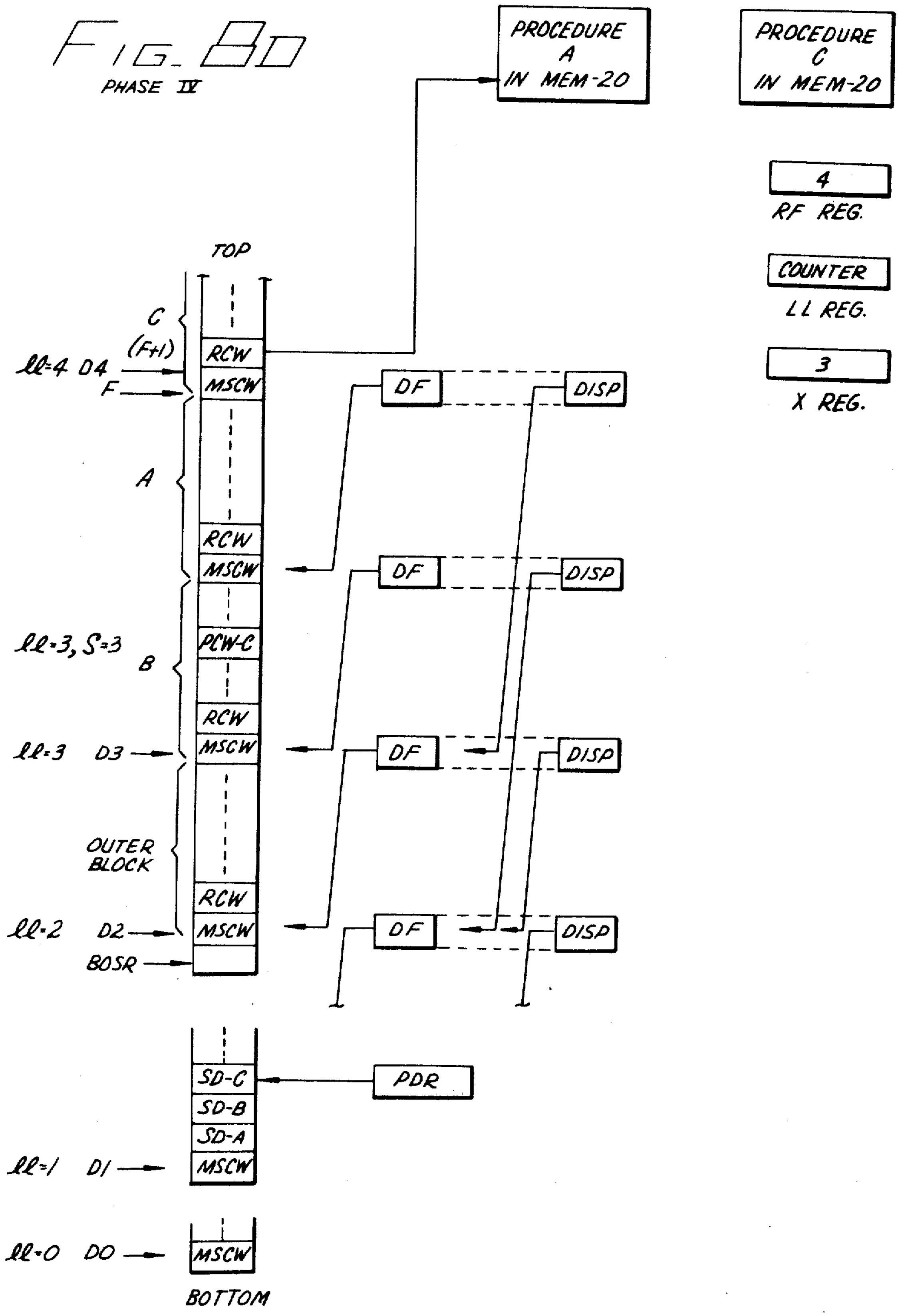

Phase IV: During Phase IV the display registers are updated. The update process is accomplished by changing the addresses contained in the display registers so they point at the correct MSCWs in the new stack areas for execution of the new procedure. The new procedure in this case is procedure C. As indicated in FIG. 8D, during Phase IV the display register 4 (D4) is set so that it now contains the absolute address of the MSCW at the base of the stack area for Procedure C, display register 3 (D3) is set with an address which points at the MSCW at the base of the stack area for procedure B. It is important to note that the address contained in display register 2 (D2) again contains the address pointing to the MSCW at the base of the stack area for the block OUTER. Thus the updating of display register D2 is bypassed by the apparatus of the present invention. Also the value 4 in the LL register 29 is transferred to the RF register for temporary storage so that the LL register can be used as a counter during Phase IV. Note also that X register 201 contains the value 3 which is the lexicographical level of procedure A which has called procedure C.

Phase V: During Phase V the segment descriptor for procedure C (SD-C) is obtained and the content thereof is used to derive the absolute address of the base of procedure C. This absolute address is stored into sub-register BPR of the program register 22. Also the LL register is restored to its previous value by transferring the contents of the RF register to the LL register.

DETAILED DESCRIPTION OF OPERATION

Figure 4C:
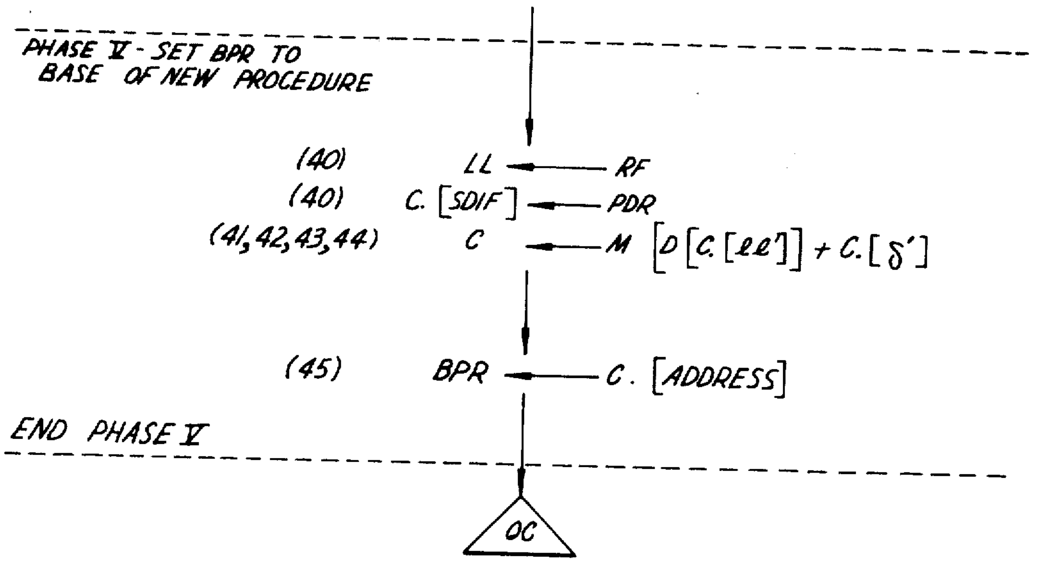
FIGS. 4A through 4C comprise a flow diagram illustrating the sequence of operation of the computer system of FIG. 1.
Figure 4A:
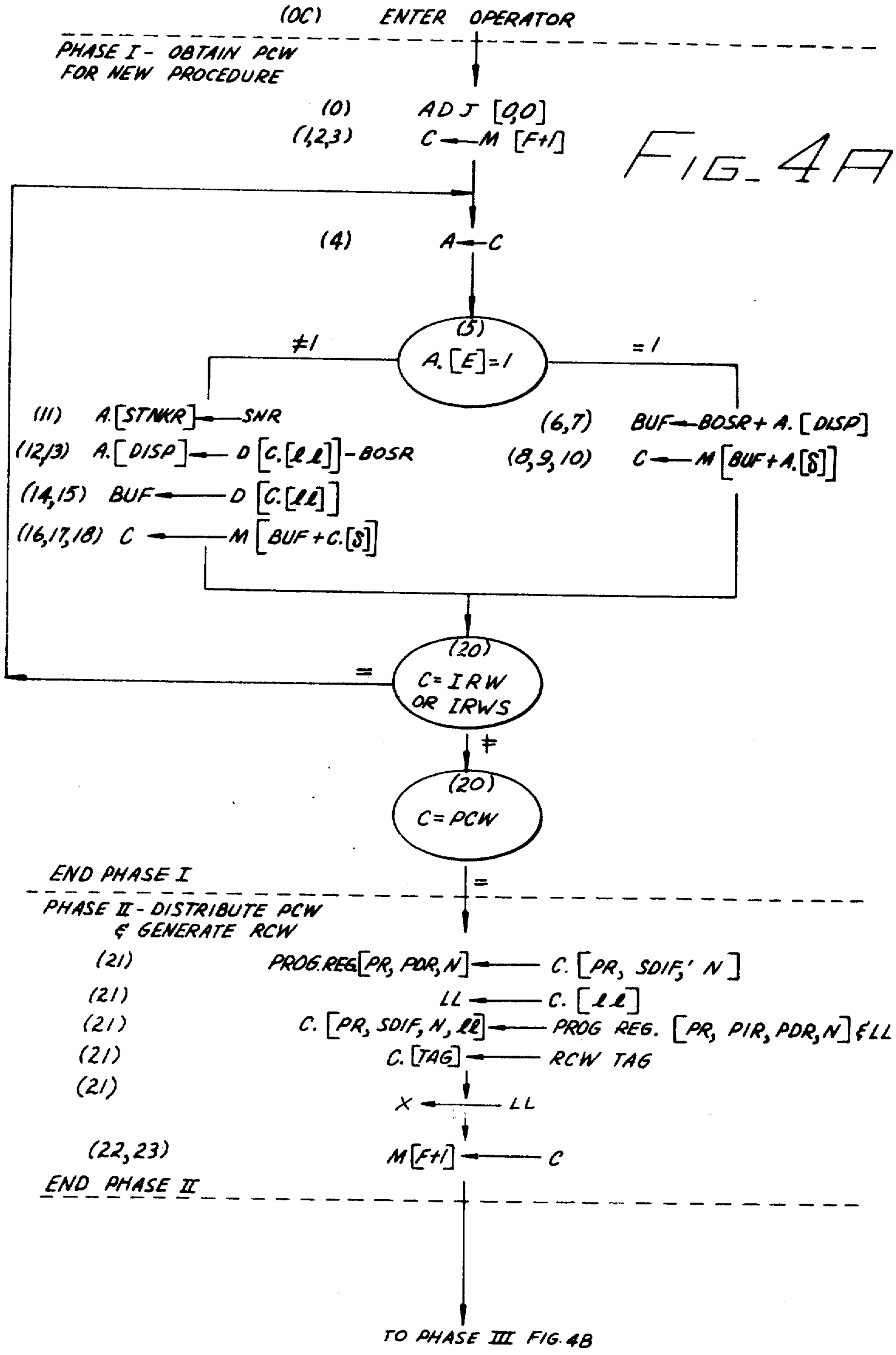
Figure 4B:
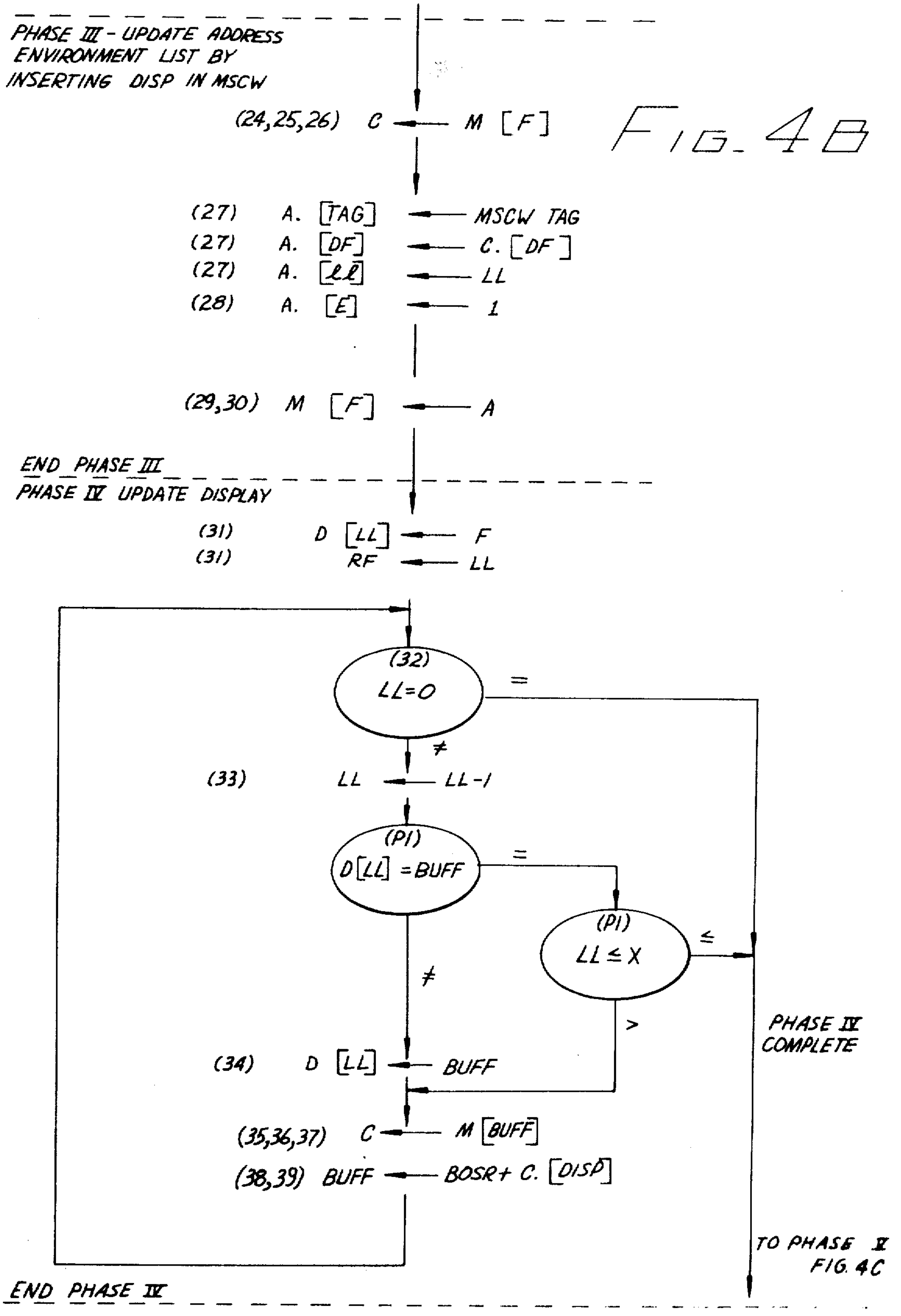

With the aforegoing brief description in mind, refer now to the details of the operation of the computer system of FIG. 1 with reference to the flow diagram of FIGS. 4A through 4C. The description will be given with reference to the operations during each phase. FIGS. 4A through 4C represent symbolically the sequence of operation of the system of FIG. 1. The numbers in the parenthesis, i.e., (0), (1, 2, 3) represent states of the control and timing unit 10 and the output circuits T0 through T45 which receive the timing signals for each state. FIGS. 4A through 4C should be followed in the following description for a complete understanding of the operation.

Phase I: During state 0 the control and timing unit 10 causes the ENTER operator to be read from memory and stored into the operator register 24 in a conventional manner in the computer art. The ENTER operator causes the control and timing unit 10 to initially go to state 0 where the stack is pushed down or adjusted such that the top two registers in the stack, namely the A register 14 and the B register 16, are empty. An explanation of the circuits and procedure to accomplish this operation are described in U.S. Pat. No. 3,593,312 entitled DATA PROCESSOR HAVING OPERAND TAGS TO IDENTIFY AS SINGLE OR DOUBLE PRECISION, filed in and assigned to the same assignee as this application. This operation, in brief, is accomplished by transferring the information in the A and B registers through the gate 18 into the memory 20 under control of the control and timing unit 10.

The control and timing unit 10 then forms control signals at the outputs T1, T2 and T3 in sequence. These control signals cause the address contained in the F register to be increased one unit and the corresponding memory location to be read out and stored in the C register 12.

Consider this operation. The control signal at T1 causes the gate **22*a* of the program register 22 to cause the address contained in the F register to be read out and applied to the input bus 26*b* of the address adder 26. The control signal at T1 also causes the gate 38 to apply a signal representing a value 1 to the input bus 26*a*. The address adder 26 immediately adds the value 1 to the address applied to the bus 26*b* and the result is applied to the output bus 26*c*. The control pulse at T1 also causes the gate 30 to store the address ($F$+1) into the MM register 20*a*. The subsequent timing signal at T2 causes the read and write control unit 20*c* to initiate a read cycle in the memory 20 causing the content of the addressed memory location to be read out and stored into the information register 20*b*. The following control signal at T3 causes the gate 18 to store the information from the information register 20*b* into the C register 12.**

It should be noted that the $F$ register contains the address of the incomplete MSCW and that the next sequential memory location in the stack ($F$+1) is the IRWS which is pointing to the PCW-C stored in the storage area for procedure B. Thus, at this time the C register 12 contains the IRWS.

The control signal at T4 causes the content of the C register 12 to be transferred by a gate 40 to the A register 14 so that the A register now contains the IRWS pointing to the PCW-C.

Following state 4 the control and timing unit goes into state 5. During state 5 a check is made to see whether the IRW stored in the A register is a stuffed IRWS or a regular IRW. If the indirect reference word is stuffed, then the E field contains a 1 value and the control and timing unit 10 goes on to states 6 and 7. However, if the E field contains a 0 value (is not equal to 1), then the control and timing unit 10 goes on to states 11 through 18.

In the example given herein the reference word is a stuffed IRWS, the E field being a 1. Therefore, the control and timing unit 10 goes on to states 6 and 7.

During states 6 and 7 the absolute address contained in the BOSR register is added to the DISP field contained in the A register and the result is stored in the BUFF sub-register. This result is the address of the MSCW at the base of the storage area for procedure B. During states 8, 9 and 10, the $\delta$ value of the IRWS in the A register is added to the result giving the address of the PCW-C. This resulting address is then used to address the memory and read out the program control word for storage into the C register 12.

Considering this operation in detail, the control signal at T6 causes the gate **22*a* to cause the content of the BOSR register of the program register 22 to be applied to the input bus 26*a* of the address adder 26. The control signal at T6 also causes the gate 28 to couple the DISP value of the IRWS contained in the A register 14 to the input bus 26***b*. The address adder 26 instantaneously adds the two values together and the sum is applied at the output bus 26*c*. The control signal at T7 causes the gate 22*a* to store the sum back into the BUFF sub-register of the program register 22. The BUFF sub-register will continue to store this sum throughout Phases I, II and III. Following the control pulse at T7, the control pulses at T8, T9 and T10 are formed. The control signal at T8 causes the gate 22*a* to apply the content of the BUFF sub-register to the bus 26*a* and causes the gate 28 to apply the δ value from IRW in the A register to the input bus 26*b*. The address adder 26 again adds the two values and this time forms the actual address of the PCW-C. The control signal at T8 also causes the gate 30 to store the resulting address into the MM register 20*a*. The control signal at T9 causes the read and write control circuit 20*c* to read out the content of the addressed memory location and store it into the information register 20*b*. The control signal at T10 causes the content of the information register 20*b* to be stored via the gate 18 into the C register 12. Thus, at the end of the control signal at T10 the C register 12 contains the PCW-C.

Following state 10, the control and timing unit 10 goes into state 20 where a check is made to see whether the word contained in the C register 12 is an IRW or an IRWS. If it is, then the control and timing unit 10 goes back to state 4 where states 4, etc. are repeated. The purpose of this loop is to read out another word, and this is repeated until a word is obtained which is a PCW and not an IRW or an IRWS. It should be noted that the decoder 42 connected to the C register 12 checks the tag field of each word as it is stored in the C register 12 and generates a control signal at the output circuit IRW each time an IRW or IRWS is stored. The outputs of the decoder 42 are connected back to the control and timing unit 10 for control of the operation thereof. When during state 20 a program control word is detected in the C register 12 by the decoder 42 it causes the control and timing unit 10 to go on to state 20' and then on to state 21, which is a part of Phase II.

It will be noted that had the IRW not been a stuffed IRW but a regular one, that the address couple (*ll*, δ) in the IRW would have been used to obtain the address of the desired PCW. A regular IRW is used when the reference is to a PCW within the addressing environment of the present procedure, as opposed to a stuffed IRW which refers to a PCW outside thereof. In the case of a regular IRW states 11 through 18 would have been entered rather than 6 through 10. The operations for the control signals at T11 through T13 cause certain operations which need not be considered in the present example of operation.

The control signal at T14 would cause the *ll* value in the C register to be transferred to the DRSR register 25 by the gate 28 and to be applied to selection matrix 127 by gate 206. This would cause the DRSR register and the selection matrix 128 to select and read out the address from the corresponding one of the display registers 24. The address is applied on the bus 26*a*. Since no address is applied on the other bus 26*b*, the address on 26*a* is applied unaltered to the bus 26*c*. The control signal at T15 causes the gate 22*a* to store the address into the BUFF sub-register. The address so stored in the BUFF sub-register would be the absolute address of the MSCW for the procedure in which the new procedure was declared.

The control signal at T16 causes the gate 28 to apply the δ value from the C register to the bus 26*b* and simultaneously causes the gate 22*a* to apply the content of the BUFF register to the bus 26*a*. The adder 26 adds the two together and the result, applied on bus 26*c*, is the address of the desired PCW. The control signal at T16 also causes the gate 30 to store the result from bus 26*c* into the MM register 20*a*. The control signal at T17 causes the read and write control unit 20*c* to read out the PCW from the addressed memory location and store it into the information register 20*b*. The control signal at T18 causes the gate 18 to store the PCW from the information register 20*b* into the C register 12. The operation then continues as described hereinabove.

Continue now with the actual example of operation being explained herein.

Phase II: During Phase II the contents of certain registers in the program register 22 are interchanged with the content of the C register 12. The purpose of this interchange is to place an RCW in memory to which the computer is to return following the execution of procedure C and to set up the corresponding registers of the program register 22 for the new procedure C.

To this end, the control signal at T21 causes the gates 28 and 22*a* to store the content of the PR, SDIF' and N fields of the PCW-C contained in the C register 12 into the PR, PDR and N subregisters, respectively, of the program register 22. Additionally, the timing signal T21 causes the gate 28 to store the lexicographical level (*ll*) value of the PCW-C (a value of 4) contained in the C register 12 into the LL register 29. In addition, the timing signal at T21 causes the gate 200 to transfer the contents of LL register 29 to X register 201. Thus X register 201 will store the value 3 which is the lexicographical level of procedure A. In addition, the timing signal at T21 causes the gate 40 to store a tag into the tag field of the C register 12 representing an RCW. Further, the control signal at T21 causes the gates 22*a* and 228 to store the contents of the PR, PIR, PDR, and N sub-registers and the LL register 29 into the PR, SDIF, N and *ll* fields of the C register 12, thereby forming an RCW. Thus, at the end of state 21 of the control and timing unit 10, the C register 12 contains an RCW, a tag to appropriately mark it and the program information required to return the computer to procedure A following the execution of procedure C.

During states 22 and 23 of the control and timing unit 10, the RCW contained in the C register is stored into the same memory location from which the corresponding IRWS was read. To this end the control signal at T22 causes gate 22*a* to read out the address contained in the *F* register onto the input bus 26*b* and causes the gate 38 to simultaneously apply signals representing a value of 1 to the input bus 26*a*. The address adder instantaneously forms the sum ($F+1$) on the output bus 26*c*. The control signal at T22 also causes the gate 30 to store the resulting address into the MM register 20*a* and causes the gate 18 to store the RCW from the C register into the information register 20*b*. The control signal at T23 causes a read cycle during which the RCW is stored into the addressed memory location ($F+1$).

This new storage condition of the stack is reflected in FIG. 8B. It will also be noted that FIG. 8B reflects that the content of the PDR register has been changed and that it now contains the absolute address of the segment descriptor for procedure C (SD-C), that the LL register 29 now contains a value 4 which is the lexicographical level of procedure C and the RCW related to the procedure C storage area of the stack points back to machine language code for procedure A.

Phase III: During Phase III the incomplete MSCW stored at the bottom of the stack area for procedure C is completed by putting in the DISP field. The DISP references the MSCW at the bottom of the stack for procedure B. It should be noted at this point that the A register 14 still contains the IRWS which was read from the memory location *F*+1 of the stack area for procedure C. This IRWS was inserted in the stack and contains the DISP field which references the MSCW at the bottom of the stack area for procedure B. This DISP field is the one which is placed into the incomplete MSCW. It should also be noted carefully that rather than reading out the MSCW at the base of procedure C and inserting the DISP field into that word, that the MSCW is read out and various parts thereof are stored around the DISP field of the IRWS contained in the A register 14 to form the complete MSCW. To this end, the control and timing unit 10 goes through states 24 through 30.

The control signal at T24 causes the content of the F register of the program register 22 to be applied to one of the input buses to the address adder 26. The other input bus does not carry any signals, and accordingly the address adder 26 applies the address from the *F* register, unaltered, to the output bus 26*c*. The *F* register and hence the bus 26*c* carry the address of the MSCW at the base of the storage for procedure C. The control signal at T24 also causes the gate 30 to store the address into the MM register 20*a*. The control signals at T25 and T26 cause the memory to read out the MSCW from the addressed memory location and causes the gate 18 to store the MSCW into the C register 12 in a manner similar to that described above.

During state 27 of the control and timing unit 10, the tag for the IRWS contained in the A register 14 is changed to a MSCW tag and the other information from the MSCW is transferred from the C register 12 to the A register 14 around the DISP field of the IRW contained therein.

To this end, the control signal at T27 causes the gate 40 to place an MSCW tag into the tag field of the A register and place the DF field of the MSCW contained in the C register 12 into the DF of the IRWS contained in the A register 14. Also the control pulse at T27 causes the gate 28 to transfer the contents of the LL register 29 into the *ll* field of the A register 14. A control pulse at T28 causes the gate 40 to store a 1 value into the E field of the A register 14. Thus, the A register 14 now contains a complete MSCW with a DISP field. The complete MSCW is now ready and stored back into the bottom of the stack area for the procedure C from which the incomplete MSCW was read.

To this end, the control pulse at T29 causes the address contained in the F register to again be applied to the address adder 26 and then stored unaltered into the MM register 20*a* in a similar manner to that described hereinabove. Additionally, the control signal at T29 causes the gate 18 to store the complete MSCW from the A register 14 into the information register 20*b*. The control signal at T30 causes the complete MSCW to be stored back into the memory location specified by the address contained in the MM register 20*a*.

Referring to FIG. 8C, it will be noted that following Phase III the stack now contains the complete MSCW with a DISP field which points back to the MSCW stored at the base of the storage area for procedure B.

Phase IV: During Phase IV the display registers are updated by putting new addresses into them. As a result, the display registers will reflect the stack condition for the new procedure C. To this end, the control and timing unit 10 enters states 31 through 39 and state P1.

FIG. 8C reflects the condition of the registers at the end of Phase III. The LL register contains the value 4. The value 4 was placed in the LL register during Phase II and was obtained from the PCW-C. The value 4 in the LL register is the level of procedure C (see FIG. 5). X register 201 stores the value 3 which is the lexicographical level of procedure A.

The control signal at T31 causes the gate 22*a* to apply the content of the F register to the bus 24*d* and causes the LL register to be coupled to the selection matrix 128. The write signal from the selection matrix 128 causes the address from the F register to be stored into the display register D4 specified by the value in the LL register 29. Therefore, following the control signal at T31, the display register D4 points to the MSCW at the base of the stack area for procedure C. This condition is reflected in FIG. 8D which shows the condition of the registers at the end of Phase IV.

Continuing on with the operation during Phase IV, the control signal at T31 also causes the gate 32 to store the content of the LL register 29 into the RF register 34. The RF register 34 serves as a temporary storage for the level value (*ll*) for the new procedure to enable the LL register 29 to be used as a counter in the following sequence of operation.

Following state 31 the control and timing unit 10 goes into state 22 where a check is made to see if the content of the LL register 29 is zero.

The decoder 44 provides an output signal at the output circuit *LL*=0 when the *LL* register 29 is zero. States 32, 33, P1 and 34 through 39 form a loop in which the computer stays until the display register update is complete. Each time the loop is entered the content of the *LL* register 29 is counted down one unit during T33. When the display register update is complete a Phase IV complete signal is formed which causes the control and timing unit 10 to go to Phase V where states 40 and 45 are entered.

Consider now the loop between the states 32 through 39. During state 33 the control signal T33 causes the gate 32 to count the content of the LL register 29 down by one unit. In the example being explained at this time, the LL register 29 has been reduced from a value of 4 to a value of 3.

Following state 33, the control timing unit 10 goes into state P1 where a check is made to determine whether it is necessary to continue to update the remaining display registers. During state P1 the control signal at P1 causes gate 205 to transfer the contents of the BUFF sub-register to one input of compare circuit 204. Recall that the BUFF sub-register has been storing the absolute address of the MSCW for procedure B since Phase I. Control signal P1 also causes gate 206 to apply the level value stored by LL register 29 to selection matrix 127 thereby selecting for reading a display register. The contents of the selected display register is read out and applied to the other input of compare circuit 204. Compare circuit 204 now compares the address which had been stored in the display register against the address which is stored in the BUFF sub-register. When the compare circuit 204 indicates that these two addresses are different, control and timing unit 10 next enters state 34 to cause the address stored in the BUFF sub-register to replace the address which was just read out of the selected display register. When the compare circuit 204 indicates that these two addresses are the same by producing a control signal on its = output the control and timing unit 10 need not enter state T34. Note that irrespective of whether or not state 34 is entered the selected display register will before the end of Phase IV store the absolute address of the MSCW for procedures B. Therefore the parameters and variables that are local to procedure B and global to the new procedure C will be made visible to the new procedure. Furthermore if at the same time that compare circuit 204 produces a control signal on its = output compare circuit 202 produces a control signal on its ≤ output AND gate 203 will produce a Phase IV complete signal. Recall that compare circuit 202 produces a control signal on its ≤ output line whenever the level value stored in LL register 29 is less than or equal to the level value of the calling procedure which has been stored in X register 201. It should be emphasized that in the preferred embodiment that there are two independent conditions which must be met before AND gate 203 produces the Phase IV complete signal. One condition is that the selected display register stores the same address as that stored in the BUFF sub-register. The second condition is that the display register must be associated with a lexicographical level (indicated by the LL register 29) that is not greater than the level of the calling procedure (the level stored in the X register 201). This condition is imposed to guarantee that the contents of an indicated register is actually valid data and not just residue information left over from some previous procedure. In this connection it should be pointed out that there could be other embodiments of the present invention which would prevent the contents of an indicated display register from fortuitously equaling the new address to be stored therein. For example, the apparatus could be modified to reset all the display registers above the current lexicographical level. As another example, an occupancy indicating flip-flop could be added to each display register. The occupancy indicating flip-flop would store a signal that indicated whether or not the data stored in its associated display register were valid.

Consider now the sequence of operation commencing at T34. The control signal at T34 causes the content of the BUFF sub-register to be transferred to the content of the display register D3, which is now specified by the LL register 29, in the manner described for the pulse at T31.

It should be noted carefully that the BUFF register now contains the address of the MSCW word at the base of the stack area for procedure B. This value was stored into the BUFF register during state 7 of Phase I and has remained there unaltered. Thus, the display register D3 now contains the address of the MSCW at the base of the storage for procedure B.

During states 35, 36 and 37 the MSCW at the base of the stack area for procedure B is read out. The purpose of obtaining this MSCW from memory is to obtain its DISP field and use it to compute the address of the reset MSCW in the stack area for the lexicographical chain. This address will be placed into the number of the display register now pointed to by the LL register 29 minus 1, i.e., D2.

The control signal at T35 causes the address contained in the BUFF register to be read out and coupled through the address adder 26 to the gate 30 which stores the address into the MM register **20*a*. The control signals at T36 and T37 cause the content of the addressed memory location, namely the MSCW, at the base of the stack area for procedure B to be read out and then stored into the C register by the gate 18. The MSCW now stored in the C register 12** contains another DISP value. This DISP value points back to the MSCW at the base of the stack area for the block OUTER.

The control signal at T38 causes the gate 28 to apply the DISP field contained in the C register 12 to the input bus **26*b* of the address adder 26. Simultaneously, the control signal at T38 causes the gate 22*a* to apply the content of the BOSR register to the input bus 26*a*, and the address adder 26 combines the two values together to form the address of the MSCW stored at the base of the storage area for the block OUTER. The control signal at T39 causes the gate 22*a*** to store the result back into the BUFF register.

The control and timing unit 10 now goes from state 39 back to state 32 and since the LL register 29 contains a value of 3 and not 0, states 33 through 39 are again entered. During state 33 the content of the LL register 29 is again counted down by one value so that it now contains a value of 2 and, therefore, points to display register D2.

Following state 33 control and timing unit 10 enters state P1. During state P1 the address in display register D2 is read out and compared against the contents of the Buff sub-register. Since these two addresses are the same, compare circuit 204 produces a control signal on its = output line. This control signal is applied to partially enable AND gate 203. The content of the LL register 29 is a value 2 and the X register a value 3. Therefore the compare circuit 202 produces a control signal on its ≤ output line causing the other input to AND gate 203 to be enabled. Since AND gate 203 is now fully enabled it produces the Phase IV complete signal. When the Phase IV complete signal is produced control and timing unit will go from state P1 to states 40 through 45 to execute Phase V.

It should be noted that if the circumstances were such that all display registers required updating the computer system would remain in the Phase IV loop causing LL register 29 to be counted down to zero. When the count in LL register 29 finally reaches zero, the computer system would recognize this fact during state 32 by checking decoder 44 and would enter states 40 through 45 of Phase V from state 32 instead of from state P1 as in the present example of operation.

Phase V: During Phase V the segment descriptor for the new procedure, namely procedure C, is obtained from the base of the stack and the address contained in the segment descriptor is used to set up the BPR register so that it points at the base of the new procedure C.

To this end, the control signal at T40 causes the gate 32 to store the level of the current procedure, namely level 4, back into the LL register 29. The PDR register contains the value of the SDIF' field obtained from the PCW-C which was stored during Phase II. Additionally, the control signal at T40 causes the content of the PDR register to be applied to one of the input buses to the address adder 26 and since no other input is applied, the address adder 26 applies the address unaltered to the output bus 26c. The gate 28 stores the address from the output bus 26*c* into the SDIF field of the C register 12. As pointed out hereinabove, the SDIF' field contains a special lexicographical level *ll'* and a special δ' field. The lexicographical level *ll'* points to display register D1 which is the display register which points at the MSCW stored at the bottom of the stack containing the segment descriptors. The δ' field is a value which when added to the absolute address contained in the display register D1 forms the absolute address of the segment descriptor for procedure C, (SD-C).

During states 41 through 44 the system of FIG. 1 reads out the segment descriptor SD-C and stores it into the C register 12. To this end, the control signal at T41 causes the gate 28 to store the lexicographical level value *ll'* into the DRSR register 25, and the selection matrix 128 selects display register D1, causing the absolute address contained therein to be read out and applied to the input bus 26*a*. The control signal at T42 causes the gate 28 to apply the δ' field contained in the C register to the input bus 26*b*. The address adder 26 adds the two values together and forms the absolute address of the segment descriptor SD-C. The control signal at T42 causes the gate 30 to store the resulting address from the address adder 26 into the MM register 20*a*. A control signal at T43 causes the read and write control unit 20*c* to start a memory cycle and read out the segment descriptor SD-C. The control signal at T44 causes the gate 18 to store the segment descriptor from the information register into the C register 12.

With reference to FIG. 1A, it will be noted that a segment descriptor contains an address. In SD-C this is the address of the base of procedure C. This address is the one which is to be stored into the BPR register for use during execution of procedure C. To this end, the control signal at T45 causes the gates 28 and 22*a* to store the address field from the C register into the BPR register of the program register 22.

Figure 8E:
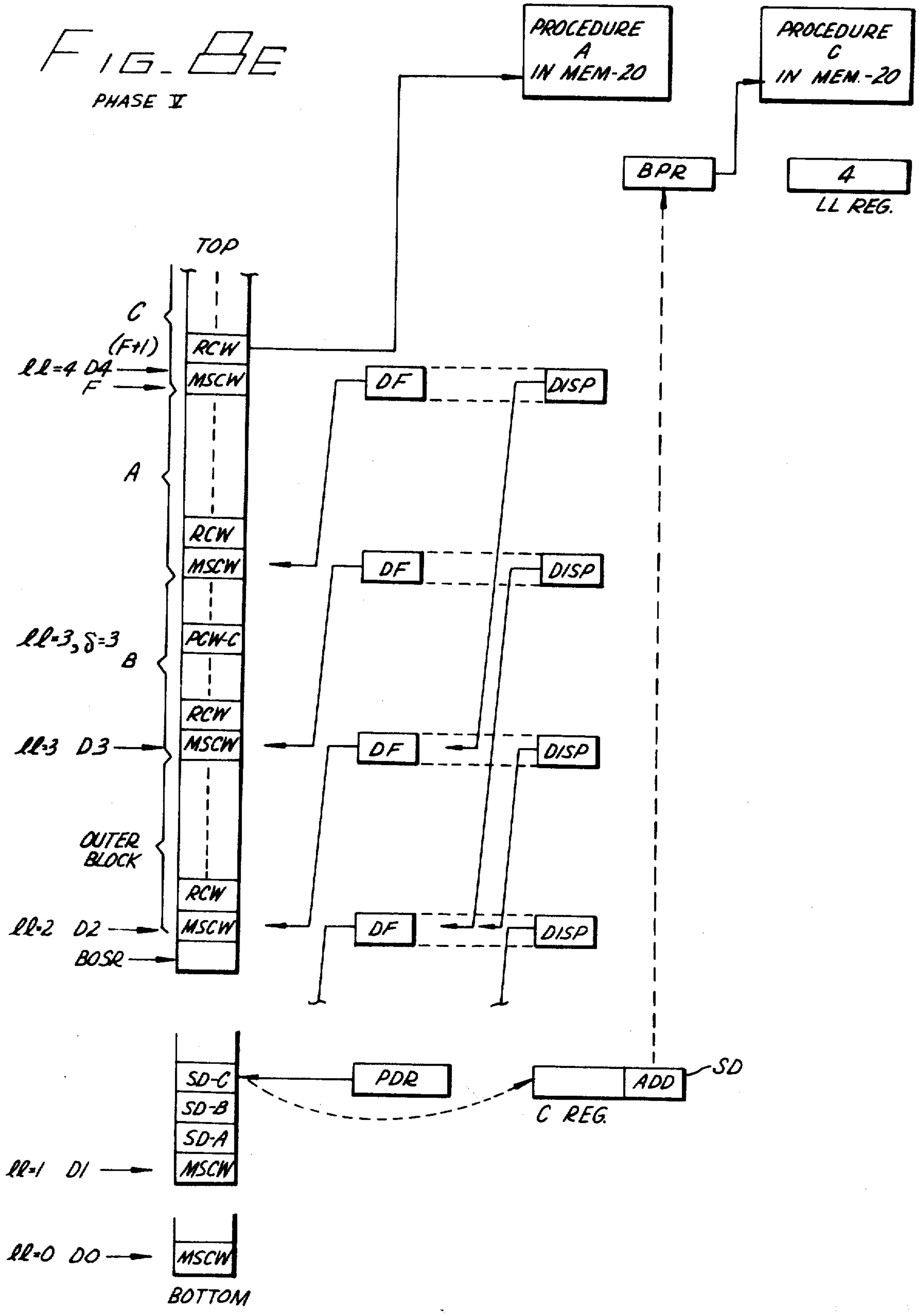

Referring to FIG. 8E, it will be seen that at the end of Phase V all of the display registers have been appropriately set and the register BPR appropriately references the base of the code containing procedure C.

Following state 45, the control and timing unit 10 automatically goes to the operation complete state and other operators are brought out and stored in the operator register 23 and executed.

The problems of the prior art and their solution by means of the present invention have been given with reference to the programming language known as ALGOL. However, similar problems exist and the solutions to these problems by means of the present invention is equally applicable to other languages that are similar to ALGOL. These languages are known as ALGOL-like languages. One example of an ALGOL-like language is known as PL/I and is defined in the report entitled "IBM System 360 Operating System PL/I Language Specifications," published by the IBM Corporation in December, 1966 and identified as IBM SRL C-28-6571-3.

I claim:

1. In a data processing system for executing a program arranged into procedural blocks each of which is assigned one of a plurality of level values and having a memory including a plurality of addressable storage locations each storing a different one of a plurality of mark words, with a plurality of displacement value fields each being contained in a different mark word and indicating the address of another one of the mark words, a plurality of the displacement value fields indicating the same address whereby the mark words are linked together to form a tree structured list having a plurality of paths each including a plurality of mark words and with the mark word stored in said same address being in a plurality of the paths, a plurality of display registers each corresponding to a different one of the level values with a plurality of addresses each being stored in a different one of the display registers, with each address being the address of a different one of the mark words that are linked together to form a first one of the plurality of paths of the tree structured list, means for reading out the addresses stored in the display registers to provide base addresses for base relative addressing during execution of a first procedural block, the data processing system being operative to stop execution of the first procedural block and make entry into a different, called procedural block for execution, and display register updating means responding to such an entry into the called procedural block for updating the display registers so that they store addresses of mark words that are linked together to form a second one of the plurality of paths for use as base addresses for base relative addressing during execution of the called procedural block, the display register updating means including means for storing into the display register corresponding to the level value assigned to the called procedural block an address of a first mark word having a displacement value field linking the first mark word into the second path of the tree structured list, means for making a series of memory accesses to obtain from mark words the displacement value fields indicating the addresses of other mark words which are linked by the obtained displacement value field into the second path of the tree and means for providing in a predetermined sequence the addresses indicated by the obtained displacement value fields to replace one by one the addresses which the display registers store, wherein the improvement comprises apparatus for bypassing the updating of display registers, the apparatus comprising: means operative during such updating for sequentially reading out the addresses stored in the display registers and address comparison means for comparing the address read out of a display register with the address provided to replace it, the address comparison means having means for producing an indicating signal when the compared addresses are the same, thereby indicating that the updating of a display register can be bypassed.

2. The apparatus as defined in claim 1 wherein the display register updating means includes a temporary storage register for storing one of the addresses provided to replace an address stored in a display register and the comparison means is a compare circuit having an input circuit coupled to the temporary storage register and coupled to the display registers and having an output circuit for producing the indicating signal when the address stored in the temporary storage register is the same as the address read out of the selected display register.

3. The apparatus as defined in claim 2 wherein the display register updating means includes an address register for the display registers, means for storing in the address register an initial level value corresponding to the level value assigned to the called procedural block, and means for sequentially changing the level value stored in the address register to define a sequence of level values, and the apparatus further comprises a register settable to store the level value assigned to the calling procedural block; level comparison means for producing an indicating signal when one of the sequence of level values stored in the address register is equal to or less than the level value assigned to the calling procedural block; and means responsive to the indicating signals produced by the address and level comparison means for producing a signal indicating that updating of the display registers is complete.

4. In a programmable data processing system having a processor and an addressable main memory storing information including a plurality of program operators of a program that is arranged into a plurality of procedures, a predetermined one of the program operators directing the processor to stop executing one procedure and to commence executing a new procedure, the information further including control words each stored at a different address and having a displacement value field, the control words being linked together by the displacement value fields to form a tree structured list each path of which indicates an addressing environment for a different one of the plurality of procedures, the processor having a plurality of display registers each for storing a pointer to a different one of the control words in the addressing environment of a procedure being executed and having control and timing means responsive to the predetermined program operator to assume a plurality of different states and produce different control signals during the different states and being responsive to indications from other circuits in the processor to repeatedly cycle through a plurality of states, the processor having first and second means responsive to said control signals, the first means for selecting display registers one by one and the second means for obtaining from the displacement value fields stored in the main memory pointers to the control words in a path of the list indicating the addressing environment for the new procedure and for updating the display registers by storing the obtained pointers one by one into the selected display registers, wherein the improvement comprises apparatus for bypassing the updating of display registers, the apparatus comprising: a comparator for producing an indication that a pointer stored in a selected display register and the pointer obtained by the second means for storing in the second display register are the same; and means for causing the control and timing means to respond to said indication to bypass the updating of the remaining display registers.

5. In a system for processing information, the system having an addressable main memory including a plurality of addressable locations respectively storing a plurality of words that are linked together by a plurality of fields to form a tree structured list having a plurality of paths each including a plurality of the words, each word in the list being associated with one of a plurality of level values, the tree structured list having entered in it a word associated with the lowest of the level values and a plurality of words respectively associated with sequentially higher level values, each of said fields being contained in a different one of said words and linking the word containing the field to a word in the same path of the list and associated with the next lower level value, the system having a plurality of display registers each associated with a sequential one of the level values and each for storing an indication of the location in the memory of a word in a path of the tree structured list, the system being operative to store a new word into a memory location and link the new word into the tree structured list, wherein the improvement comprises apparatus for updating the display registers when the new word is entered in the tree structured list comprising:

- a first register for sequentially storing indications of the level values, the first register being coupled to the display registers for selecting the display register associated with the level value stored in the first register;
- means for initially setting the first register to store an indication of the level value of the new word entered in the list, thereby initially selecting the display register associated with the level value of the new word;
- means for storing in the initially selected display register an indication of the location of the new word;
- a second register for sequentially storing indications of the locations of words in the tree structured list;
- means for initially setting the second register to store an indication of the location of an old word in the tree path in which the new word is entered, which old word is associated with the next lower level below the level value of the new word entered in the list;
- a third register for sequentially storing words of the tree structured list;
- means operable for changing the indication stored in the first register so that the first register selects a different display register; the different display register being associated with the next lower level value below the level value of the display register selected before the operation;
- means operable for reading out the contents of the different display register;
- means operable for comparing the contents read out of the different display register and the contents of the second register, and for producing an indication of whether the different display register needs updating;
- means operable in response to an indication that the different display register needs updating for storing therein the contents of the second register;
- means responsive to the indication stored in the second register for reading out the word from the indicated location and storing the word in the third register;
- means responsive to the linking field within the read out word for changing the indication in the second register so as to indicate the location of another word in the same path of the tree; and
- means for causing the six last named means to operate in sequence until the means for comparing indicates that no further display register updating is necessary.

6. In a programmable data processing system for processing a program that is arranged into a plurality of procedural blocks, each of the blocks being assigned one of a plurality of level values, the first one of the blocks having declared therein a second one of the blocks, the second block being a calling procedure that orders programmatic entry into a third, called one of the blocks, the system having a memory including a plurality of storage locations each having an address, said locations storing information including a plurality of control words each stored at a different address and each associated with one of the plurality of level values, the control words being linked together to form a tree structured list each path of which indicates an addressing environment for a different one of the blocks, the system having a plurality of display registers each corresponding to a sequential one of the plurality of level values and each for storing the address of a control word associated with its corresponding level value, a method of updating the display registers comprising the steps of:

1. storing the level value assigned to the calling procedure;
2. storing the level value assigned to the called block for indicating a display register;
3. storing into the indicated display register the address of the control word that is in the addressing environment of the called block and that is associated with the same level value as the called block;
4. storing for comparison the address of the control word that is in the addressing environment of the first block and that is associated with the same level value as the first block;
5. changing the level value for indicating a display register so as to indicate a display register corresponding to a sequentially different level value;
6. reading out the address stored in the display register indicated by the level value as changed by Step 5;
7. comparing for equality the address read out in Step 5 and the address stored for comparison;
8. when the operation of Step 7 indicates inequality, writing into the display register indicated by the level value as changed in Step 5 the address stored for comparison;
9. replacing the address stored for comparison with the address of the work linked to the word contained in the address being replaced;
10. repeating Steps 5 through 9 until the operation of Step 7 indicates equality responsive thereto terminating Steps 5 through 9.

7. In a data processing apparatus having memory means storing information that is arranged into a plurality of different stack areas, the information including a plurality of groups of mark words and a plurality of reference values respectively contained in a plurality of the mark words, the mark words being respectively positioned in the plurality of stack areas, each reference value referencing another mark word in a preselected sequence to link the mark word containing the reference value to the same group of mark words that includes the mark word being referenced by the reference value for linking the stack areas together to form a tree structured stack, the apparatus further having a plurality of display registers for respectively storing a plurality of addresses, each address indicating the position of a different one of the mark words that are linked together in any selected one of the groups, and display register updating means operable for changing the addresses stored in the display registers so that they respectively indicate the positions of the mark words in a first group that is different from a second group that was so indicated before the operation, the updating means including means for sequentially utilizing the reference values in a series of linked mark words stored in the memory for forming a series of addresses to which the display registers are to be set, means for sequentially storing the formed addresses in the order they are formed into the display registers, whereby updating of the display registers proceeds in a predetermined sequence; wherein the improvement comprises: means for detecting when a series of addresses being formed are addresses of mark words that are in both the first and second groups whereby said series of addresses being formed are respectively the same as the addresses in the corresponding display registers into which such formed addresses are to be stored, and means responsive to the detection for disabling the updating means.

8. In a data processing apparatus as defined in claim 7 including register means for storing the address of a mark word positioned in a preselected one of the stack areas, said address forming means comprising means for combining the reference value in each mark word in such series with the address stored in the register means and thereby form the addresses to which the display registers are to be set.

9. In a data processing apparatus according to claim 8 wherein said detecting means comprises means for reading out the content of said display registers in the order they are being updated, means for comparing the addresses being formed with said addresses being read from said display registers for detecting an equality therebetween and means responsive to said detection of equality for disabling the updating means.

10. In a data processing apparatus according to claim 9 wherein said detecting means comprises storage means for storing a signal indicative of a display register used before the updating operation to store an address of a preselected one of the mark words in the second group, storage means for sequentially indicating each display register in the order they are updated and means for comparing the content of the last two named storage means for a predetermined correspondence, said means for disabling being responsive to the combination of said detection of equality and said predetermined correspondence for disabling the updating means.

11. A data processing system comprising:

an accessible main memory including a plurality of addressable locations each storing a mark word, each mark word being associated with one of a plurality of level values, some of the mark words being associated with the same level value, each of a plurality of the mark words containing a displacement value field indicating the address of a mark word associated with a sequentially different level value from the mark word containing the displacement value field, a plurality of the displacement value fields each indicating the same address so that the mark words are linked together to form a tree structured list having a plurality of paths, each path including a plurality of the mark words, and with at least the mark word stored in said same address being in both a first and a second one of the paths;

a display register memory including a plurality of display registers each corresponding to a sequential one of the level values and each for storing the address of a mark word associated with its corresponding level value, a plurality of the display registers respectively storing the addresses of the mark words linked in the first path of the list;

means for updating the display registers so that they store the addresses of the mark words in the second path of the list, the updating means being operative to bypass the updating of display registers that store addresses of mark words that are linked into both the first and second paths, the updating means comprising:

means operative for sequentially providing the address of each mark word linked in the second path of the list including means operative to utilize each of the addresses indicated by the displacement value fields of the mark words in the second path for making a main memory access to obtain a displacement value field indicating the address of another mark word in the second path;

means for sequentially comparing pairs of addresses, each pair of addresses including one of the sequentially provided addresses and a sequentially selected one of the addresses stored in the display register memory, the comparing means including means for sequentially indicating whether the compared addresses are not equal or equal;

means for storing into the display register memory each provided address indicated as not equal to the address compared with it so as to replace the address compared with it; and means responsive to an indication that the compared addresses are equal for terminating the operation of said means for making a main memory access.

12. A system according to claim 11 wherein the means for sequentially comparing includes a first register for storing a level value to select a display register, means for storing in the first register an initial level value, means for sequentially changing the level value stored in the first register by a predetermined amount, means for reading out one by one the addresses stored in the display registers selected by the sequentially level values, a second register for storing one by one the provided addresses, and a compare circuit having an input circuit coupled to the second register and coupled to the display registers and having an output circuit for producing an indication signal when the address stored by the second register is the same as the address read out of a selected display register.

13. A system according to claim 12 wherein the means for terminating includes a third register and means for setting the third register to store the level value associated with a preselected one of the mark words in the first path and further includes level value comparison means for producing an indication signal when the level value stored in the first register is equal to or less than the level value stored in the third register; and means responsive to the indication signals produced by the address and level value comparison means for producing an operation complete signal.

14. A programmable data processing system comprising:

a main memory including a first plurality and a second plurality of locations each location having an address, the first plurality of the locations storing program operators for first and second program procedures respectively associated with first and second ones of a plurality of level values;

a data processor for executing the procedures stored in the main memory and including a display register memory;

the program operators for the first procedure including a program operator ordering the processor to programmatically enter the second procedure for execution;

the second plurality of locations including a first preselected location storing a first mark word associated with the first one of the level values and being programmatically addressable during execution of the first procedure, a second predetermined location storing a second mark word associated with the second one of the level values and being programmatically addressable during execution of the second procedure, a third predetermined location storing a third mark word associated with a third one of the level values and being programmatically addressable during execution of either the first or the second procedure, and a plurality of locations respectively storing a plurality of other mark words, each mark word including a displacement value for indicating the address of a location storing another mark word so that the mark words are linked together in a list, a plurality of the displacement values each indicating the same address so that the list is tree structured;

the display register memory including a plurality of display registers each associated with a different level value, the display register associated with the first one of the level values storing during execution of the first procedure an indication of the address of the first preselected location, the display register associated with the third level value storing an address of the third preselected location during execution of the first procedure, and the display registers associated with level values in between the first and third level values storing an indication of addresses of locations storing mark words in the list linking the first to the third mark word;

means responsive to the program operator ordering programmatic entry into the second procedure for updating the display register memory, the updating means including means for storing into the display register associated with the second level value an indication of the address of the second predetermined location;

means for sequentially obtaining an indication of the address of each location storing a mark word linking the second to the third mark word;

means for sequentially accessing each display register associated with a level value between the first and third level to read out the respective indications stored therein;

means for sequentially comparing the obtained indications and the indications read out from the display registers and for identifying when the respectively compared indications are the same, thereby indicating whether the updating of an accessed display register can be bypassed; and means for sequentially storing into each accessed display register that cannot be bypassed a respective one of the obtained indications.

* * * * *